US012705870B1

(12) United States Patent
Prasad et al.

(10) Patent No.: US 12,705,870 B1
(45) Date of Patent: Aug. 11, 2026

(54) VISION DATA ENRICHMENT AND ANNOTATION PLATFORM

(71) Applicant: Target Brands, Inc., Minneapolis, MN (US)

(72) Inventors: Anil Prasad, Bengaluru (IN); Bindu Shetty, Bengaluru (IN); Lavanya Nagaraj, Bengaluru (IN); Nitin Khandelwal, Bengaluru (IN); Anagha Subramanya, Bengaluru (IN)

(73) Assignee: Target Brands, Inc., Minneapolis, MN (US)

( * ) Notice: Subject to any disclaimer, the term of this patent is extended or adjusted under 35 U.S.C. 154(b) by 237 days.

(21) Appl. No.: 18/756,297

(22) Filed: Jun. 27, 2024

(51) Int. Cl.
*G06V 10/776* (2022.01)
*G06N 20/00* (2019.01)
*G06V 10/774* (2022.01)
*G06V 10/94* (2022.01)

(52) U.S. Cl.
CPC ........... *G06V 10/776* (2022.01); *G06N 20/00* (2019.01); *G06V 10/774* (2022.01); *G06V 10/945* (2022.01)

(58) Field of Classification Search
CPC .. G06V 10/776; G06V 10/774; G06V 10/945; G06N 20/00
See application file for complete search history.

(56) References Cited

U.S. PATENT DOCUMENTS

| | | | | |
|---|---|---|---|---|
| 8,009,864 | B2 | 8/2011 | Linaker et al. | |
| 8,630,924 | B2 | 1/2014 | Groenevelt et al. | |
| 8,774,504 | B1 | 7/2014 | Sundareswara et al. | |
| 10,318,848 | B2 | 6/2019 | Dijkman et al. | |
| 10,748,030 | B2 | 8/2020 | Hari et al. | |
| 10,977,518 | B1 * | 4/2021 | Sharma | G06V 10/764 |
| 11,341,454 | B2 | 5/2022 | Bogolea et al. | |
| 2015/0262116 | A1 | 9/2015 | Katircioglu et al. | |
| 2018/0181885 | A1 * | 6/2018 | Higo | G06N 20/20 |
| 2020/0401851 | A1 * | 12/2020 | Mau | G06V 10/774 |
| 2021/0350124 | A1 * | 11/2021 | Roy Chowdhury | G06V 30/1916 |
| 2022/0222952 | A1 * | 7/2022 | Luo | G06T 7/0012 |
| 2022/0374930 | A1 * | 11/2022 | Baranwal | G06N 20/00 |

(Continued)

FOREIGN PATENT DOCUMENTS

| | | | |
|---|---|---|---|
| CN | 107832662 | B | 3/2018 |
| EP | 3561775 | B1 | 10/2019 |

(Continued)

OTHER PUBLICATIONS

Plainsight website, Enterprise Computer Vision Begins with Data Annotation, Aug. 23, 2023, 15 pages.

(Continued)

*Primary Examiner* — Syed Haider
(74) *Attorney, Agent, or Firm* — Merchant and Gould, PC

(57) ABSTRACT

A platform for data collection and annotation is disclosed. The systems and methods herein describe a system that can receive vision data from a plurality of heterogenous sources and store this vision data in a common datastore. The vision data is then processed (for example, prioritized and annotated) at common applications, while security and access rights features are maintained. Machine learning models for annotation are trained in such a way as to generate an efficient and accurate model, while ensuring that manual annotation costs remain below a set budget.

17 Claims, 12 Drawing Sheets

(56) References Cited

U.S. PATENT DOCUMENTS

| | | | | |
|---|---|---|---|---|
| 2023/0016464 | A1* | 1/2023 | OConnor | G06N 20/00 |
| 2023/0106490 | A1* | 4/2023 | Guttula | G06F 16/215<br>707/690 |
| 2024/0135984 | A1* | 4/2024 | Wang | G11C 5/025 |

FOREIGN PATENT DOCUMENTS

| | | | |
|---|---|---|---|
| WO | 2020096098 | A1 | 5/2020 |
| WO | 2021111670 | A1 | 6/2021 |
| WO | 2021216357 | A1 | 10/2021 |

OTHER PUBLICATIONS

Label Studio Website, Open Source Data Labeling, Aug. 23, 2023, 5 pages.
LabelID Website, LabelID by sweppner, Aug. 23, 2023, 1 page.
SuperAnnotate Website, Annotation Tool, Aug. 23, 2023, 12 pages.
Markup Hero Website, Free Screenshot & Annotation Tool, Aug. 23, 2023, 8 pages.
TELUS International Website, All Image Data, Aug. 23, 2023, 13 pages.
H20 Label Genie Website, Supported Annotation Tasks, Aug. 23, 2023, 5 pages.

* cited by examiner

500

Receive input vision data from a plurality of tenants, the input data including a plurality of vision data files. — 502

Process, at a data collection application, the input data from each of the plurality of tenants. — 504

Store the input data and metadata from each of the plurality of tenants in a common central database. — 506

Generate, at the data management application, an annotation request associated with each file of the plurality of files of the input data. — 508

Receive, at a vision data enrichment application, the annotation request. — 510

Annotate, at the vision data enrichment application, each file according to the associated annotation request. — 512

Store each annotated file in the central database, wherein each annotated file is associated with the security requirement of the input un-annotated file. — 514

Receive a request from a tenant of the plurality of tenants to view an annotated file. — 516

Based on the security requirement for the requested annotated file, provide the annotated file to the requesting tenant. — 518

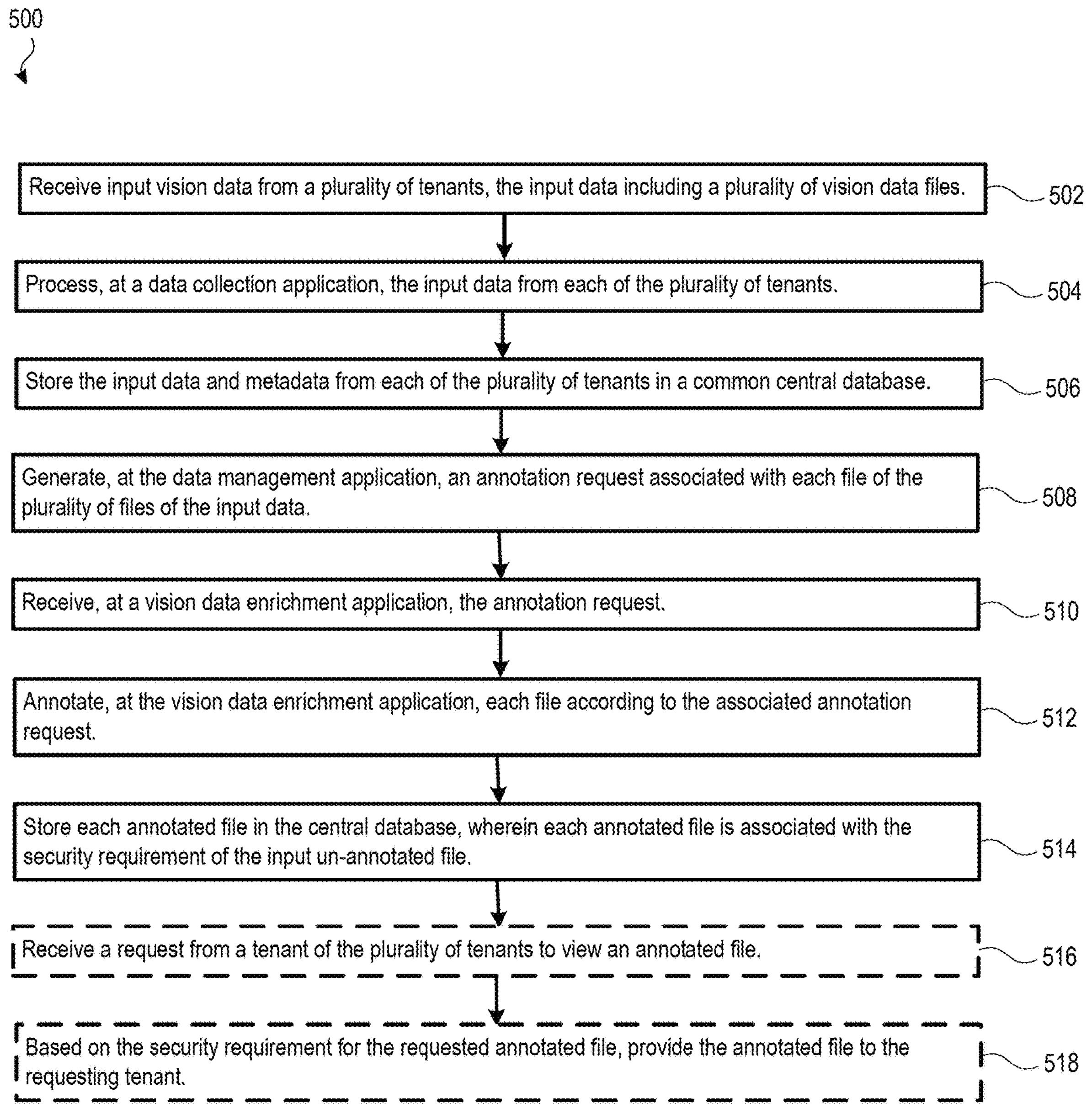

FIG. 5

VISION DATA ENRICHMENT AND ANNOTATION PLATFORM

BACKGROUND

An enterprise may utilize media content data in a multitude of ways to benefit its business operations. An enterprise may utilize media content, including images, in advertising and marketing campaigns, to attract new customers and retain or increase the patronage of new customers. An enterprise may also utilize media content, including images, to analyze product shelf placement; build or train machine learning models; detect safety hazards in brick-and-mortar stores, warehouses, mixing centers, parking lots, or other physical areas; to identify products or waste objects in operation environments; or to perform myriad other important tasks. In these uses, images may be annotated (e.g. labeled or tagged) to identify key features associated with the images, so that they may be utilized for beneficial purposes by the enterprise. Annotations which are inaccurate or less relevant to enterprise interests make it difficult for enterprise users to identify and select appropriate images for use and detect important features of selected images. Because images may be generated and used by many different users within an enterprise, piecemeal storage of images may lead to inefficient use of the image data resources. Further, multiple tenants, in some examples both within and outside of the enterprise, may desire to utilize media content tools, but may have security and privacy concerns related to providing their media content to a shared platform.

SUMMARY

An enterprise image management platform is provided. Such an enterprise image management platform may utilize media content data, including image data, in a multitude of ways to benefit its business operations, and this image data may include annotations to aid users in finding and utilizing the images. Images and other types of media content may be received at an enterprise system for annotation. This content may be received from multiple tenants and in multiple filetypes. The enterprise system may include an end-to-end platform for media content/data ingestion, collection, and automatic analysis and annotation. Received data may be segregated and stored (for example, in a secure data repository, where data from all tenants may be processed but each tenant's data remains private from other tenants). Data may be prioritized for one or more types of annotation. Annotation may occur at a data curation application that provides a workflow for annotating media (for example, images), with semi-automated image annotation task assignment. Annotated images may be stored in a central database, where they may be accessed by enterprise users and/or tenants for various purposes. In some examples, a priority model (which may be an artificial intelligence model) may determine that an annotated image needs more or different annotations. These images may be assigned a priority for a place in a queue for further annotation. Once further annotated, the images may then be stored. In some examples, the artificial intelligence models may be retrained using the annotated images.

The data curation application includes may include methods for expanding annotation ability within an existing budget or computer capability. In a situation where there are more images that need to be annotated than would historically have been able to be annotated within a given budget or computer capability, a smaller, random sample of the images may be annotated. These annotations my then be reviewed and the model will learn based on those results. A different smaller, random sample of the images is then selected and annotated and learned. An inference may be run on the ML model, and a number of the samples with a lowest confidence score may be reannotated. The ML model is re-trained. The steps (of annotating the samples with the lowest confidence scores and re-training the model accordingly) may be repeated within the existing budget. The finally trained ML model may then be utilized on the entire set of images to be annotated, resulting in annotations at a higher confidence level.

In a first example aspect, a computing system comprises: at least one processor; and at least one memory storing computer-executable instructions, the computer-executable instructions when executed by the at least one processor causing the computer to: receive input vision data from a plurality of tenants, the input data including a plurality of vision data files from a plurality of heterogeneous vision data capture contexts associated with the plurality of tenants, the plurality of vision data files each having associated metadata defining a source and indicating a security requirement associated with the tenant from which the input media was received; process, at a data collection application, the input data from each of the plurality of tenants; store the input data and associated metadata from each of the plurality of tenants in a common central database; generate, at a data management application, an annotation request associated with each file of the plurality of files of the input data, the annotation request identifying the file and the associated metadata; receive, at a vision data enrichment application, the annotation request; annotate, at the vision data enrichment application, each file according to the associated annotation request, wherein annotation includes updating the metadata associated with each file; store updated metadata in the central database, wherein the updated metadata is associated with the file and the security requirement; receive a request from a tenant of the plurality of tenants to view an annotated file; based on the security requirement for the requested annotated file, provide, from a data access application communicatively connected to the common central database, the annotated file including the updated metadata to the requesting tenant.

In another example aspect, a computing system comprises: at least one processor; and at least one memory storing computer-executable instructions, the computer-executable instructions when executed by the at least one processor causing the computer to: receive input vision data from a tenant; receive a security requirement associated with the input vision data from the tenant; process, at a data collection application, the input data; store the input data and the associated security requirement in a central database; generate, at a data management application, an annotation request associated with the input data, the annotation request identifying the input data; determine, at the data management application, a priority associated with the annotation request; receive, at a vision data enrichment application, the annotation request and the associated priority; annotate, at the vision data enrichment application, the input data according to the annotation request and the associated priority; store the annotated input data in the central database; receive, at a data access application, the annotated input data and the associated security requirement; based on the security requirement, provide the annotated input data to the tenant.

In another example aspect, an enterprise image data management platform executable on a computing platform includes one or more computing systems, and the enterprise vision data management platform comprises: an access interface application including tenant API configured to communicate with a plurality of tenants, the plurality of tenants including enterprise vision data collection tenants and enterprise vision data consumption tenants, the access interface application including a data collection interface and a data access interface, wherein the data collection interface is configured to obtain enterprise vision data from the enterprise vision data collection tenants that are operating in a plurality of heterogeneous vision data collection contexts; and wherein the data access interface allows selective access to each of the enterprise vision data consumption tenants in accordance with data access rights associated with respective ones of the enterprise vision data consumption tenants, the enterprise vision data consumption tenants including a plurality of enterprise applications configured for access to enriched enterprise vision data from different selected ones of the heterogeneous vision data collection contexts; a vision data storage system including an enterprise-scale database storing the enterprise vision data received from across the plurality of heterogeneous vision data collection contexts; a vision data enrichment application including a predictive annotation application and a manual annotation application, the predictive annotation application including a plurality of predictive models operable to predict annotations in an associated at least one of the heterogeneous vision data collection contexts; an enterprise data management application exposing an API accessible to the access interface application, the enterprise data management application managing access to the vision data storage system for the vision data enrichment application and the data access interface of the access interface application; wherein the access interface application receives feedback from at least some of the plurality of tenants regarding accuracy of annotations provided by the vision data enrichment application in one or more of the heterogeneous vision data collection contexts and initiates updates to training of the predictive annotation application, wherein initiating updates to training of the predictive annotation application initiates creation of training data via the manual annotation application.

In another example aspect, a computing system comprises: at least one processor; and at least one memory storing computer-executable instructions, the computer-executable instructions when executed by the at least one processor causing the computer to: receive: a plurality of images to be annotated at a machine learning platform trained using a training data set, the training data set comprising annotated image data, and a budget for the annotation of the plurality of images; automatically annotate, at the machine learning platform, each of the plurality of images, wherein each annotated image of the plurality of images has an associated annotation confidence score; select a first set of images of the plurality of images, the first set of images being lesser in quantity than the plurality of images, the first set of images having an annotation confidence score below a threshold; receive user-directed re-annotated images of each of the first set of images, the re-annotated images having an annotation confidence score above the threshold, wherein annotating each image of the first set of images by a user draws from the budget; train the machine learning platform using the re-annotated images; randomly select a second set of images of the plurality of images, the second set of images being lesser in quantity than the plurality of images; validate a resulting machine learning model using a first validation set, wherein validating the resulting machine learning model comprises: receiving user-directed annotated images of each of the second set of images, the annotated second set of images being designated as the first validation set, wherein annotating each image of the second set of images by the user draws from the budget; automatically annotating, at the machine learning platform, each of the second set of images; and comparing the automatically annotated second set of images and the first validation set; update the machine learning platform based on the validation; determine a remaining amount of the budget; based on the remaining amount of the budget: randomly select a test set of images of the plurality of images, the test set of images being lesser in quantity than the plurality of images; receive user-directed annotated images of each of the test set of images, wherein annotating each image of the test set of images by the user draws from the budget; automatically annotate, at the updated machine learning platform, each annotated image of the annotated test set of images, thereby testing the machine learning model; calculate final annotation confidence scores for each of the annotated test set of images; and automatically annotate, at the machine learning platform, utilizing the tested machine learning model, each image of the plurality of images that was not included in a previously selected set of images for annotation.

In an example aspect, a method comprises: receiving a plurality of images to be annotated at a machine learning platform trained using a training data set, the training data set comprising annotated image data; automatically annotating, at the machine learning platform, each of the plurality of images, wherein each annotated image of the plurality of images has an associated annotation confidence score; selecting a first set of images of the plurality of images, the first set of images being lesser in quantity than the plurality of images, the first set of images having an annotation confidence score below a threshold; receiving user-directed re-annotated images of each of the first set of images, the re-annotated images having an annotation confidence score above the threshold, wherein annotating each image of the first set of images by the user draws from a budget; training the machine learning platform using the re-annotated images; randomly selecting a second set of images of the plurality of images, the second set of images being lesser in quantity than the plurality of images; validating a resulting machine learning model using a first validation set, wherein validating the resulting machine learning model comprises: receiving user-directed annotated images of each of the second set of images, the annotated second set of images being designated as the first validation set, wherein annotating each image of the second set of images by the user draws from the budget; automatically annotating, at the machine learning platform, each of the second set of images; and comparing the automatically annotated second set of images and the first validation set; updating the machine learning platform based on the validation; determining a remaining amount of the budget; based on the remaining amount of the budget: randomly selecting a test set of images of the plurality of images, the test set of images being lesser in quantity than the plurality of images; receiving user-directed annotated images of each of the test set of images, wherein annotating each image of the test set of images by the user draws from the budget; automatically annotating, at the updated machine learning platform, each annotated image of the annotated test set of images, thereby testing the machine learning model; calculating final annotation confidence scores for each of the annotated test set of images; and automatically annotating, at the machine learning platform, utilizing the tested machine learning model, each image of the plurality of images that was not included in a previously selected set of images for annotation.

In an example aspect, a computing system comprises: at least one processor; and at least one memory storing computer-executable instructions, the computer-executable instructions when executed by the at least one processor causing the computing system to: receive an annotation request at an annotation tool, the annotation request identifying a model and a training data set including a plurality of images to be annotated; automatically annotate, at a machine learning platform, each of the plurality of images in the training data set, wherein each annotated image of the plurality of images has an associated annotation confidence score; select a first subset of images of the plurality of images having annotation confidence scores below a threshold; receive user-directed re-annotation of each of the first set of images, wherein the user-directed re-annotation of each image of the first set of images by a user draws from a budget; retrain the model at the machine learning platform using the plurality of images in the training data set including a portion of the automatically annotated images having annotation confidence scores above the threshold and the re-annotated images to form a retrained model; select a second subset of images of the plurality of images; receive user-directed re-annotation of each of the second set of images; validate the retrained model by comparing the user-directed re-annotation of each of the second set of images against automatic annotations of each of the second set of images generated using the retrained model; determine a remaining amount of the budget; based on the remaining amount of the budget, determine whether to iteratively select a further subset of the plurality of images for user-directed re-annotation; and automatically annotate, at the machine learning platform, utilizing the retrained model, each image of a plurality of images that was not included in a previously selected set of images for annotation.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 5 illustrates an example method for annotating images at a vision data platform, according to an example.

DETAILED DESCRIPTION

Figure 1:
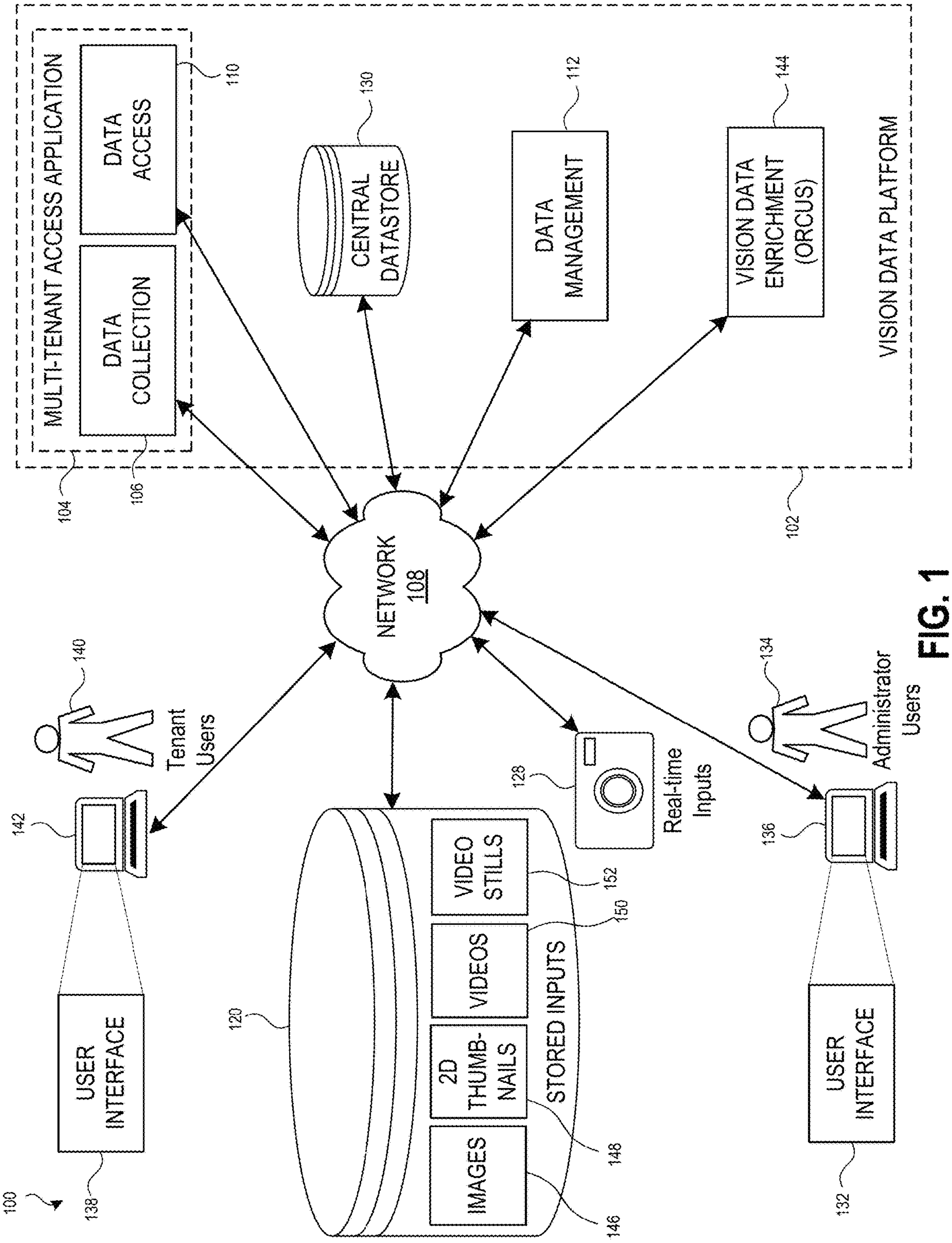
FIG. 1 illustrates an example vision data system, according to an example.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. The following detailed description is therefore not to be taken in a limiting sense, and the scope of the present disclosure is defined by the appended claims and their equivalents.

An enterprise may utilize media content data (vision data), including image data and/or video data, in a multitude of ways to benefit its business operations, and this image data may include annotations to aid users in finding and utilizing the images. Analyzed and annotated media may be used in a variety of downstream applications, such as to determine current state of products on shelves, out of stock status, fire aisle compliance, entrance and exit security status, or other purposes.

In large enterprise environments, the wide variety of types of applications of vision data may result in use of a variety of separate, disconnected image and video processing platforms, each of which being customized for the specific use case for which they are employed. This results in a number of problems. First, many business users may wish to leverage the same captured enterprise image data in different combinations, but different image data may be managed in separate and incompatible storage systems, having different data freshness, format, or associated metadata that may make combination difficult or impossible. Furthermore, with the increasing use of machine learning and inference systems within enterprises, image data often requires annotation to create accurate training data sets. Use of disparate image data collections results in either use of multiple data annotation teams and inefficient use of annotation resources, or results in such teams working with data in a number of different formats and on a number of different platforms, causing confusion.

At the same time, maintaining datasets separately may have advantages to users, because individual enterprise teams may easily control access to potentially sensitive image data (e.g., video or image data capturing employee or customer actions, transaction data, and the like).

Accordingly, in the context of the present disclosure, an enterprise vision data management platform is provided that manages a central database of enterprise vision data, maintains data enrichment applications and monitors vision data inferencing tools to ensure that their context-specific accuracy requirements are maintained. Coordination of a centralized manual data annotation platform is provided, with annotation budget management that allows for intelligent allocation of human annotation resources to highest-priority annotation tasks. Enterprise tenants may be provided controlled access to context-specific vision data based on the needs and rights of such tenants, from ta common interface and data repository. Accordingly, an enterprise may be provided with a single source of truth and automated annotation of vision data from across heterogeneous vision data collection contexts. Further, as metadata associated with each file is updated in the central database by the various tools (e.g. when an image is annotated), the central database may maintain a master image file that can then be processed and enriched by the updated metadata. Having this single master file maintained and updated centrally provides computing efficiencies, eliminates additional data transfers between applications of the overall system, and minimizes storage requirement (i.e., each application does not need to have enough storage to separately store each image).

In the particular context of manual annotation, an annotation tool may utilize a budget-based approach for centralized manual annotation tasks. A set of vision data to be manually annotated for use as training data may be automatically annotated using one or more machine learning models, with a confidence of such automated annotation being used to identify low-confidence annotations. Vision data associated with such low-confidence annotations may be provided for manual review and correction, with efforts monitored against an overall annotation budget (as defined by amount of manual efforts involved). An iterative model retraining and assessment process may be used to validate the updated training data and trained models until a performance standard is met, In some examples, data provided by tenants to the vision data platform may include vision data/media data such as images, videos, video stills, thumbnails, and other data types. Vision data may be captured by enterprise tenants or external tenants; vision data may be provided by an external source such as a customer, or by an internal source such as an employee or camera system. In some examples, the vision data is captured by a camera. For example, a camera of an enterprise may capture image or video of a stockroom/warehouse, a packing area, a shipping/loading dock, a parking lot or roadway, a store aisle, a checkout area, a shelf-edge, or others.

Images and other types of media content may be received at an enterprise system for annotation. This content may be received from multiple tenants and in multiple filetypes. The enterprise system may include an end-to-end vision data platform for media content/data ingestion, collection, and automatic analysis and annotation. Received data may be segregated and stored (for example, in a secure data repository, where data from all tenants may be processed but each tenant's data remains private from other tenants). Data may be prioritized for one or more types of annotation. Annotation may occur at a data curation application that provides a workflow for annotating media (for example, images), with semi-automated image annotation task assignment. Annotated images may be stored in a central database, where they may be accessed by enterprise users and/or tenants for various purposes. In some examples, a priority model (which may be an artificial intelligence model) may determine that an annotated image needs more or different annotations. These images may be assigned a priority for a place in a queue for further annotation. However, in some circumstances, images may need to be manually annotated. This may be, for example, when it is observed that a model used to automatically detect certain objects is losing accuracy or effectiveness. In such instances, an API may be used to define a task priority. The task priority provides prioritization of specific images or image sources for manual annotation, such that annotated images may be used in training, or retraining, of an automatic object detection model for automatic annotation. In some examples, prioritization may include analysis of specific limits to daily annotation that are set based on prior performance. In some examples, the vision data platform can automatically predict limits based on factors such as productivity and vacation planning for manual annotators. Once further annotated, the images may then be stored. In some examples, the artificial intelligence model(s)/machine learning model(s) may be retrained using the annotated images. The vision data platform provides a at least one user interface where tenants may interact with the platform.

The data curation application includes may include methods for expanding annotation ability within an existing budget or computer capability. In a situation where there are more images that need to be annotated than would historically have been able to be annotated within a given budget or computer capability, a smaller, random sample of the images may be annotated. These annotations my then be reviewed and the model will learn based on those results. A different smaller, random sample of the images is then selected and annotated and learned. An inference may be run on the ML model, and a number of the samples with a lowest confidence score may be reannotated. The ML model is re-trained. The steps (of annotating the samples with the lowest confidence scores and re-training the model accordingly) may be repeated within the existing budget. The finally trained ML model may then be utilized on the entire set of images to be annotated, resulting in annotations at a higher confidence level.

The vision data platform and its applications may dynamically change regarding inputs from various sources/tenants and machine learning outputs. The vision data platform integrates machine learning (artificial intelligence) into prioritization systems, annotation systems, and other systems. Additionally, the vision data platform includes tenant security and secure access features throughout the integrated system and its utilized databases. The vision data platform system provides a centralized system for media/image data management and annotation (including prioritization) that provides significant efficiency advantages to an organization that uses data (for example, video and/or image capture data) and analysis across multiple use cases and for multiple tenants.

In some examples, media content including images may be received at an enterprise system for annotation. In some examples, a priority model (which may be an artificial intelligence model) may determine that a specific model used to identify and annotate images may need to be retrained. This may be because, for example, the model is designed to identify an object (e.g., a particularized object, or a class of objects), but that object's appearance has changed (e.g., a packaging change for a retail item on a shelf). In such instances, images captured of that object may need to be annotated manually, with updated annotations provided for retraining of the model that is used for automated identification and annotation thereafter. In such cases, the specific images that need to be manually annotated may be assigned a priority for a place in a queue for further annotation. Such prioritization may be performed based on, e.g., business importance, level of inaccuracy, and the like.

In some examples, the resulting analysis of the image, e.g., via an object recognition model, may not result in product identification within a desirable accuracy level. The inability to provide accurate identification within a predetermined threshold of acceptability may be a result of incorrect annotations or a lack of annotations on the products, and may be the result of inadequate data, bad lighting, and the like. Thus, the feed for the camera or images the algorithm obtains from the camera may be prioritized for annotating by an annotator. This will increase the usefulness of the image and its data for users. In some examples, other types of data may be flagged for further annotation. Images captured at cameras facing a truck distribution parking lot may be analyzed to identify vehicles, people, and other objects. Annotating this data may provide important safety information about, e.g., timing of traffic, traffic density, hazardous conditions detected, and the like.

To further determine which cameras/data feeds the algorithm should prioritize, the algorithm may also include specified factors in the determination. One such factor may be what the camera's view encompasses. In one example, the camera may focus on shelves of a retail store location, and a model associated with the particular camera view may be trained to detect empty shelves and generate an alert in response. In that example, if product detection rates are low from captured images, the model may need to be retrained on new product items to avoid "false positive" empty shelf alerts from being generated. Accordingly, the algorithm would assign a high prioritization for annotation. In a different case, the camera may overlook an aisle that has a high amount of guest traffic. If product identification is low within models associated with that particular view, the algorithm may flag images captured by this camera as high priority for manual annotation, for example to retrain an object identification model with a goal to increase product identification for that particular camera.

In addition, the algorithm can prioritize annotation of images associated with a particular viewpoint or scene where previously observed images of objects lack accurate labels. Some images may not capture a quality view of an object, or background objects may exist in the image that might interfere with labeling the object. Thus, these images may be prioritized for annotation so the objects can have better labels. Once the object, such as a product, has a better label, the annotations and labels can contribute to better model building for product identification. Then, the models can better label/annotate products and other objects within a scene of an image automatically in subsequently-captured images, and may allow for more efficient and complete reverse product searching and/or text searching.

Once further annotated, the images may then be stored in the central database. In some examples, associated artificial intelligence models may be retrained using the annotated images. Ensuring accurate and relevant annotations are assigned to the images, which are then utilized for re-training, ensures that a retrained model will have greater accuracy. After re-training, the models can better recognize and/or predict labels, colors, texts, and objects, increasing the performance of cameras and increasing the value and usefulness of future annotated stored images.

The vision data platform disclosed herein additionally includes various reporting and auditing applications, whereby annotations and processing of data may be analyzed and shared. These applications may trigger manual or automatic adjustment of model parameters, tool functionality, model retraining, or other events to increase the accuracy and/or efficiency of annotation on the common platform.

These and other examples will be explained in more detail below with respect to FIG. 1-FIG. 12.

FIG. 1 illustrates an example vision data system 100. The various components and entities of vision data system 100 may communicate directly or via network 108. In some examples, as described herein, network 108 may include a computer network, an enterprise intranet, the Internet, a LAN, a Wide Area Network (WAN), wireless transmission mediums, wired transmission mediums, other networks, and combinations thereof. Although network 108 is shown as a single network in FIG. 1, this is shown as an example and the various communications described herein may occur over the same network or a number of different networks.

In some examples, vision data system 100 includes a vision data platform 102. Vision data platform 102 may include a multi-tenant access application 104 that may include a data collection application 106 and a data access application 110. Vision data platform 102 may receive data at multi-tenant access application 104, in some examples, at data collection application 106. The data may include vision data, such as video data, image data, thumbnail data, video still data, and/or other data. The data may be provided/received in real-time, periodically, and/or intermittently in some examples. The data may further include metadata (for example, location, tags, annotations, timestamps, and/or context).

The data may be received from one or more tenants such as tenant user(s) 140. In some examples, tenant user 140 may represent a department, group, employee, contractor, manager, or other entity of an enterprise (for example, a retail enterprise). In some examples, tenant user 140 may represent an entity that is external to the enterprise. Tenant users 140 may be producing tenants (those that provide vision data into the vision data platform 102), consuming tenants (those that consume vision data out of the vision data platform 102), or both. In consuming tenants may consume vision data that is the same or different than the data that they provided to the vision data platform 102, if any.

In some examples, tenant user interface 138 may present data (for example, images) to the tenant user 140 (for example, regarding data to be annotated or annotated data) to the tenant user 140 via a tenant device 142.

In some examples, tenant device 142 may be a desktop computer, a laptop computer, a tablet, a cell phone, a smart TV, a smart wearable device, or other appropriate electronic device which is capable of displaying the tenant user interface 138.

In an example, tenant user interface 138 is a web application. In other examples, tenant user interface 138 is a device application. In some examples, tenant user interface 138 allows tenant 140 to interact with the displayed images or other appropriate display means.

Although, in the example shown, a single tenant user 140 is depicted, it is noted that a number of tenant users may provide data to the vision data platform 102. Each of these tenant users may, in some examples, have security and privacy requirements that include making sure that other tenants do not have access to their data, associated metadata, and/or final annotated data.

In some examples, vision data platform 102 includes a central datastore 130. Central datastore 130 may be virtual (e.g. cloud-based) in some examples; in other examples, central datastore 130 may be network-based or drive-based. Although shown as a single database, central datastore 130 may represent a plurality of databases. Central datastore 130 may store data received from tenants, output data from one or more applications of the vision data platform 102, tenant security/privacy requirements, and other data.

In some examples, tenant data and/or vision data platform 102 output data may be stored in a stored inputs database 120. In some examples, vision data platform 102 may receive data from stored inputs database 120. Stored inputs database 120 may be virtual (e.g. cloud-based) in some examples; in other examples, stored inputs database 120 may be network-based or drive-based. Although shown as a single database, stored inputs database 120 may represent a plurality of databases. In some examples, stored inputs database 120 may be included within vision data platform 102 and/or central datastore 130. Stored inputs database 120 may include images 146, 2D thumbnails 148, videos 150, video stills 152, other data types, and associated metadata.

In some examples, images, stills, thumbnails, videos, and 3D files mentioned herein may be of various appropriate file types including, but not limited to: gif, jpg, png, tiff, psd, pdf, eps, RAW, svg, bmp, raster, AI format, indd, WebP, heif, mov, MPEG-4, h.264, MP4, wmv, flv, avi, WebM, mkv, avchd, CAD-supported files (such as dwg, dxf, stl, dgn, dwf, and others), stl, step, obj, 3ds, vrml/x3D, fbx, dae, iges, amf, 3mf, MP3, USDZ, gITF, glb, Collada, Blend, and others. In some examples, file types may correspond to a container (the format or package of the media) or a codec (for compressing or encoding video or other data). For example: h.264 and MPEG-4 are examples of codecs; mov and MP4 are examples of containers.

Herein, when “images” or “data” or “input data” or “media data” or input images” or “input data” or “vision data” or “data” are generally referred to in this application and examples, any of the above-described data formats (for example, any data included in stored inputs database 120 or central datastore 130) may be implicated (i.e. these terms do not limit the descriptions to only images 146), and may include images, video, audio, or other media files. Vision data may include one or more types of image-based data that is captured by the enterprise and that depicts operational aspects of the enterprise’s business (rather than being a collection of random or curated photos from external unaffiliated users).

In some examples, vision data (for example, image data or video data) may be captured at one or more real-time inputs 128. Real-time inputs 128 may include security cameras, monitoring cameras, shelf-edge cameras, and the like. Such cameras may gather data continuously, intermittently, or periodically. The gathered data may be passed to stored inputs 120, central datastore 130, and/or vision data platform 102 on a real-time basis as it is gathered. Such a camera may capture images, videos, and/or 3D scans (in some examples, stills or thumbnails may be captured from the videos and/or 3D scans) of retail store shelves, tables, racks, cabinets, other merchandise displays, packing areas, warehouses, parking lots, roads, aisles, or other locations.

In some examples, vision data platform 102 includes a data management application 112. Data management application 112 may receive vision data from central datastore 130 and/or access information from data access application 110. Data management application 112 may prioritize vision data for annotation.

In some examples, vision data platform 102 includes a vision data enrichment (and annotation) platform 144. Vision data enrichment platform 144 may receive vision data, annotation requests, and/or priority information from data management application 112. Vision data enrichment application may perform multiple functions relating to the annotation of the vision data, including workload prediction, automatic annotation, scheduling manual annotation, auditing annotation, active/machine learning relating to annotation, and other functions. Annotated data may then be passed to data management application 112 and stored in central datastore 130.

Administrator user 134 may be an employee, operator, manager, or other agent of the enterprise. Administrator user 134 may be an enterprise administrator user or an enterprise annotation user. Administrator user 134 may view and/or interact with a user interface 132 via administrator user device 136. User interface 132 may present data (for example, images) to the administrator user 134 regarding data to be annotated, system dashboards, provide an interface for annotation tools, or provide other types of displays.

In some examples, administrator user device 136 may be a desktop computer, a laptop computer, a tablet, a cell phone, a smart TV, a smart wearable device, or other appropriate electronic device which is capable of displaying the user interface 132.

In an example, user interface 132 is a web application. In other examples, user interface 132 is a device application. In some examples, user interface 132 allows annotating user 134 to interact with the displayed images or other appropriate display means to better interact with an annotation tool (for example, a software tool that provides a display to user interface 132).

Although, in the example shown, a single administrator user 134 is depicted, it is noted that a number of administrator users may be employed within an overall system such as described herein. In some examples, one or more annotating user(s) may be required to manually or semi-automatically annotate data/images. For example, multiple annotating users may be employed to annotate images, and images may be allocated to annotating users based on the prioritization defined using the data management application 112, and based on the number of annotating users available.

Annotated data may be passed to data access application 110, to ensure it is handled according to the security requirements of the tenant user 140 that supplied the original vision data. The annotated data may finally be passed to a requesting tenant 140 (if the security requirements allow).

Figure 2:
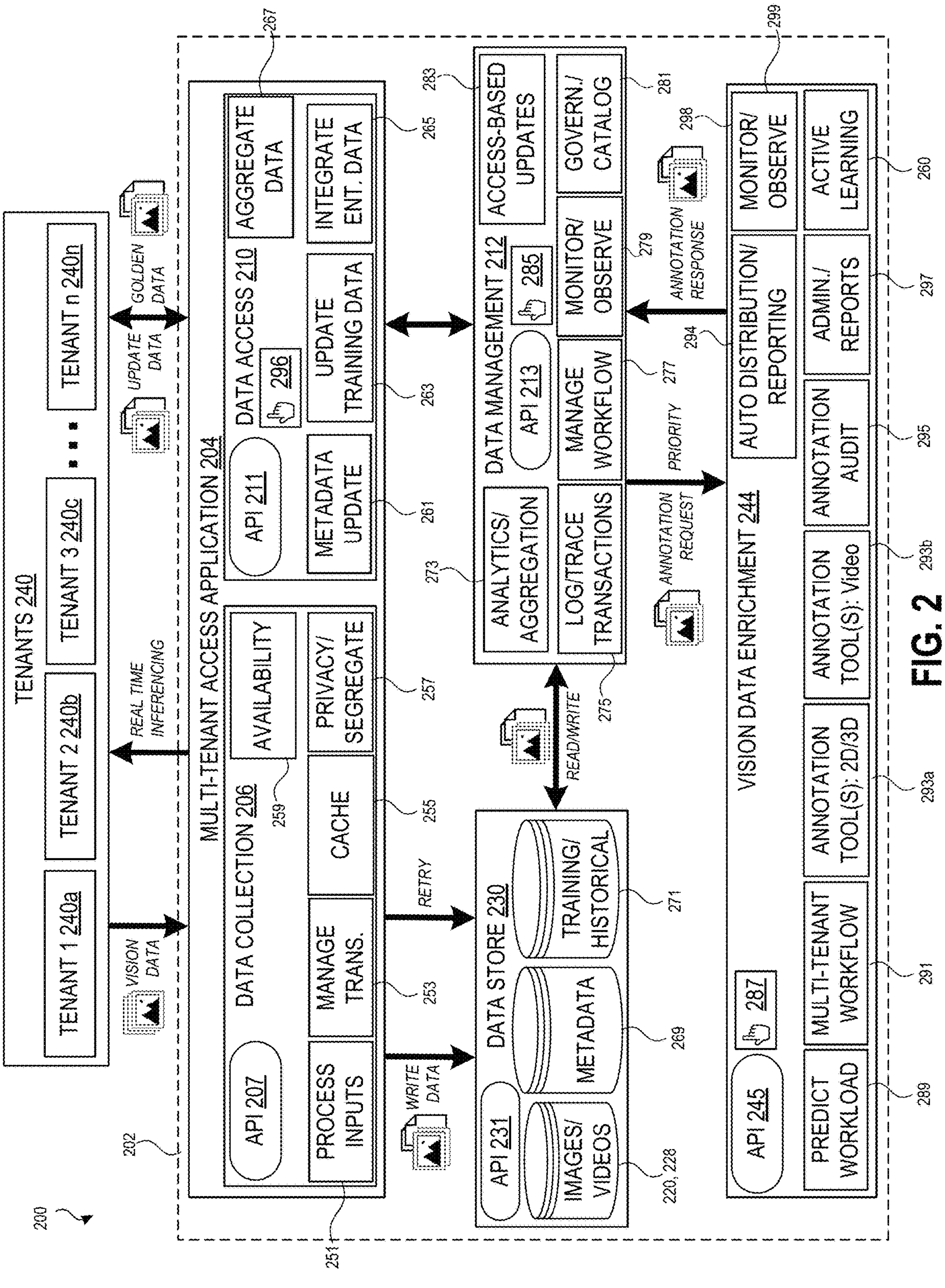
FIG. 2 illustrates an example architecture of a vision data platform of the system of FIG. 1.

FIG. 2 illustrates an example architecture 200 of a vision data platform 202 (for example, vision data platform 102) of a vision data system (for example, vision data system 100). One or more tenants 240 (Tenant 1 240*a*, Tenant 2 240*b*, Tenant 3 240*v*, Tenant n 240*n*) may provide data (for example, media data/vision data) to the vision data platform 202. Tenants 240 may be internal to or external to the enterprise. In some examples, one or more of Tenants 240 may provide data (for example, vision data such as images or videos) to a tenant user interface, to be provided to the vision data application 202 for annotation. In some examples, one or more of Tenants 240 may be internal or external (to the enterprise) consumers/users of the vision data platform 202 output information, including annotated data, metadata, reports, audits and/or other outputs. Tenants 240 may be vision data consumers and/or vision data producers.

At a multi-tenant access application 204, input data received from tenants 240 may be received at a data collection application 206. Data collection application 206 may include API 207 that defines the structure of data objects to be received at data collection application 206 (for example, may define the types of vision data and associated metadata that may be received). Data collection application 206 may include a process inputs application 251 for processing the input data from all sources (i.e. all tenants and/or real-time sources). Processing may include analysis of data, metadata, context, requests, security/privacy requirements, and other factors. Data collection application 206 may include a manage transactions application 253 for managing transactions of incoming data; validating data type, quality, or authentication; and data consistency. Data collection application 206 may include a cache 255 for storing data for repeated access when necessary. Data collection application 206 may include a privacy and segregation application 257 for applying required security/privacy requirements to incoming data, to ensure that it is stored, processed, and later output accordingly. Data collection application 206 may include an availability application 257 that may determine availability of various storage and systems/platforms/applications of the vision data platform 202.

Data collected and processed by data collection application 206 may be stored (e.g. written) to a data store 230. Data may be written incrementally to data store 230, that is, data may be stored at data store 230 immediately upon receipt from Tenants 240, and then may be re-stored or overwritten after processing by data collection platform 206. Data store 230 may include API 231 that defines the structure of data objects to be received and stored (for example, may define the types of vision data and associated metadata that may be received; for example, an image of a particular file format may include metadata relating to source, timestamp, context, location, and/or others). At data store 230, received data and any data generated by data collection application 206 is stored. For example, images 220, videos 228 (and other types of data and described above with reference to FIG. 1), metadata 269, and/or training and historical information 271 may be stored. Metadata 269 may include security requirements associated with the stored image data 220, 228 and/or the tenant 240 from which the image data 220, 228 was received.

Data management application 212 may access data (for example, image data 220) from data store 230. Data management application 212 may include API 213 that defines the structure of data objects to be received from other platforms/applications (for example, may define the types of reports, vision data, and associated metadata, including types of context and annotations that may be received). Data management application 212 may include a data analytics/aggregation application 273, a transaction logging and traceability application 275, a monitoring and observability application 279, and/or a data governance and cataloguing application 281. Data management application 212 may include an access-based updates application 283 for updating data, associated metadata, and workflows for the data (for example, annotation workflows) as needed to be consistent with security/privacy requirements for the data. Data management application 212 may include a workflow management application 277, which may manage annotation/labeling workflows in some examples. The managed workflows may be based at least in part on a determined priority. In some examples, a priority is determined prior to a first annotation of a data file. In some examples, a priority (for re-annotation) is determined after a data file has been annotated.

Data management application 212 may generate an annotation request and the priority of the request. The annotation request may include a type of annotation; identify the image data for annotation (for example, image or video data), including associated metadata (for example, including context and/or security/privacy requirements; and/or include other information related to the annotation of the data.

At a vision data enrichment platform 244, an annotation request, data to be annotated, and/or priority of the annotation request may be received from the data management application 212. Vision data enrichment platform 244 may include API 287 that defines the structure of data objects to be received from other platforms/applications (for example, may define the types of requests, priority determinations, vision data, and associated metadata, including types of context that may be received).

In some examples, an annotation may need to be completed manually or semi-automatically, when a previous annotation has a low confidence score, as part of a model training process, or for another reason. Vision data enrichment platform 244 may include a workload prediction application 289. Workload prediction application 289 may predict the availability of one or more annotation users. These availability predictions may be based at least on a number of annotation users, work schedules and hours of annotation users, vacation schedules, current workload and assignments, number of current and predicted images that need to be annotated, type of annotations required (for example, one type of annotation may take longer than another, etc.), workload capacity of one or more annotation users, and/or other factors. Based on these availability predictions and the determined priority, requests for manual annotation may be assigned to one or more particular annotation users for annotation (i.e. the resources (annotation users) are allocated to the tasks (annotation)).

Once annotation requests are assigned to annotation users, the annotation users may use programs and tools such as annotation tools for 2D and 3D images 293*a* and annotation tools for video files 293*b* to annotate the images in accordance with the annotation request.

In some examples, an annotation is completed automatically according to the annotation request and priority, by an active learning (e.g. machine learning/artificial intelligence) model 260, such as a model described below with reference to FIG. 3, FIG. 4, and/or FIG. 7.

In some examples, vision data enrichment platform 244 includes an annotation audit application 295 that audits the quality, accuracy, and/or precision of annotated images (either manually or automatically annotated data, or both). In some examples, vision data enrichment platform 244 includes a monitoring and observation application 299. In some examples, vision data enrichment platform 244 includes an administration and reports generation application 297. The output of annotation audit 295, monitoring and observation application 299, and/or administration and reports generation application 297 may indicate when annotation tools 293*a*, 293*b* need to be updated, when annotation workflows and schedules need to be altered, when annotation users need additional teaching, and/or when active learning model 260 needs to be retrained or otherwise updated.

In some examples, vision data enrichment platform 244 includes a multi-tenant workflow application 291 that ensures that requirements of various tenants (including security/privacy requirements, timing requirements and deadlines, required types of annotation, priority, and/or other requirements) are met throughout the annotation process and the applications of the vision data enrichment platform 244.

In some examples, vision data enrichment platform 244 includes an automatic distribution and reporting application 294, that may automatically make annotated data available to be stored at data store 230 and, in some examples, ultimately available for tenant access.

Vision data enrichment platform 244 may further include one or more user interfaces 287. User interfaces 287 may be accessed, in some examples, by enterprise users for monitoring of annotation tasks, viewing annotated data, interacting with active learning models, and/or review of reports. User interfaces 287 may, in some examples, be accessed by annotation users for annotating data according to annotation requests.

Annotated data (for example, images and videos) and various audit and report outputs from vision data enrichment platform 244 may be further processed at data management platform 212.

In some examples, it is determined whether annotated data files include acceptable annotations (for example, annotations which are complete and accurate) and which data files include unacceptable annotations (for example, missing annotations or annotations which are incomplete and/or inaccurate. In addition, a priority order may be determined in which the necessary data files should be further annotated. Data requiring further annotation may be assigned to a position in a queue, based on the priority and, in some examples, other workload considerations.

At an analytics and aggregation application 273, report and audit data may be collected and analyzed. The results of the analysis may provide further information on efficiency and accuracy of either/both manual and automatic annotation processes, and whether retraining or other workflow modifications need to be made. At transaction logging and traceability application 275, information associated with transactions such as priority determinations, annotation requests, annotations, reports, audits, analyses, and/or other transactions is logged so that it may be accessed and traced when necessary for analysis or review. At monitoring and observability application 279, prioritization determination processes and annotation processes are monitored to ensure proper and efficient functioning, and, in some examples, to provide status and other information to a user interface. Data governance and cataloguing application 281 facilitates the storage (for example, in data store 230) of information/data such as annotation requests, annotated data, metadata, priority determinations, reports, audits, analyses, observations, and other information. Information may be stored according to enterprise and tenant security/privacy requirements.

Data management platform 285 may further include one or more user interfaces 285. User interfaces 285 may be accessed by enterprise users for receiving updates, current status, analytics, and/or for viewing prioritization/annotation transactions.

Multi-tenant access application 204 may include, as part of a data access platform 210, metadata update application 261, update training data application 263, integrated enterprise data application 265, and data aggregation application 267. Annotated data, including associated metadata, may be received at metadata update application 261. Data access platform 210 may include API 211 that defines the structure of data objects to be received from other platforms/applications (for example, may define the types of tenant requests, and vision data and associated metadata, including annotations).

Metadata update application 261 may update metadata of stored files (for example, annotated vision data) to ensure that they reflect the appropriate annotations and security/privacy information.

Data aggregation application 267 may, in response to a request for annotated data from one or more of Tenants 1 240*a*, Tenants 2 240*b*, Tenants 3 240*c*, Tenants n 240*n*, retrieve and/or access the requested annotated data (and associated metadata) from data store 230. Based on the security/privacy requirements of the annotated data, data aggregation application 267 may determine whether or not to grant the tenant request to provide the data to the tenant. If the annotated data is to be provided to the tenant (whether as updated data to an enterprise-internal tenant or as golden data to an external tenant), the requesting tenant may receive the annotated data. The requesting tenant may receive the annotated data at a tenant device and may view it on a tenant user interface.

Data access platform 210 may further include one or more user interfaces 296. User interfaces 296 may be administrative user interfaces, accessed by enterprise users for defining access rights according to tenant security/priority requirements.

An API associated with vison data platform 202 may defines the structure of data objects to be received from other platforms/applications (for example, may define the types of data to be provided by tenants and the format of tenant requests for annotated data). Each tenant may be associated with a tenant API that defines the structure of data (for example, annotated images) the tenant may receive from the vision data platform 202.

Figure 3:
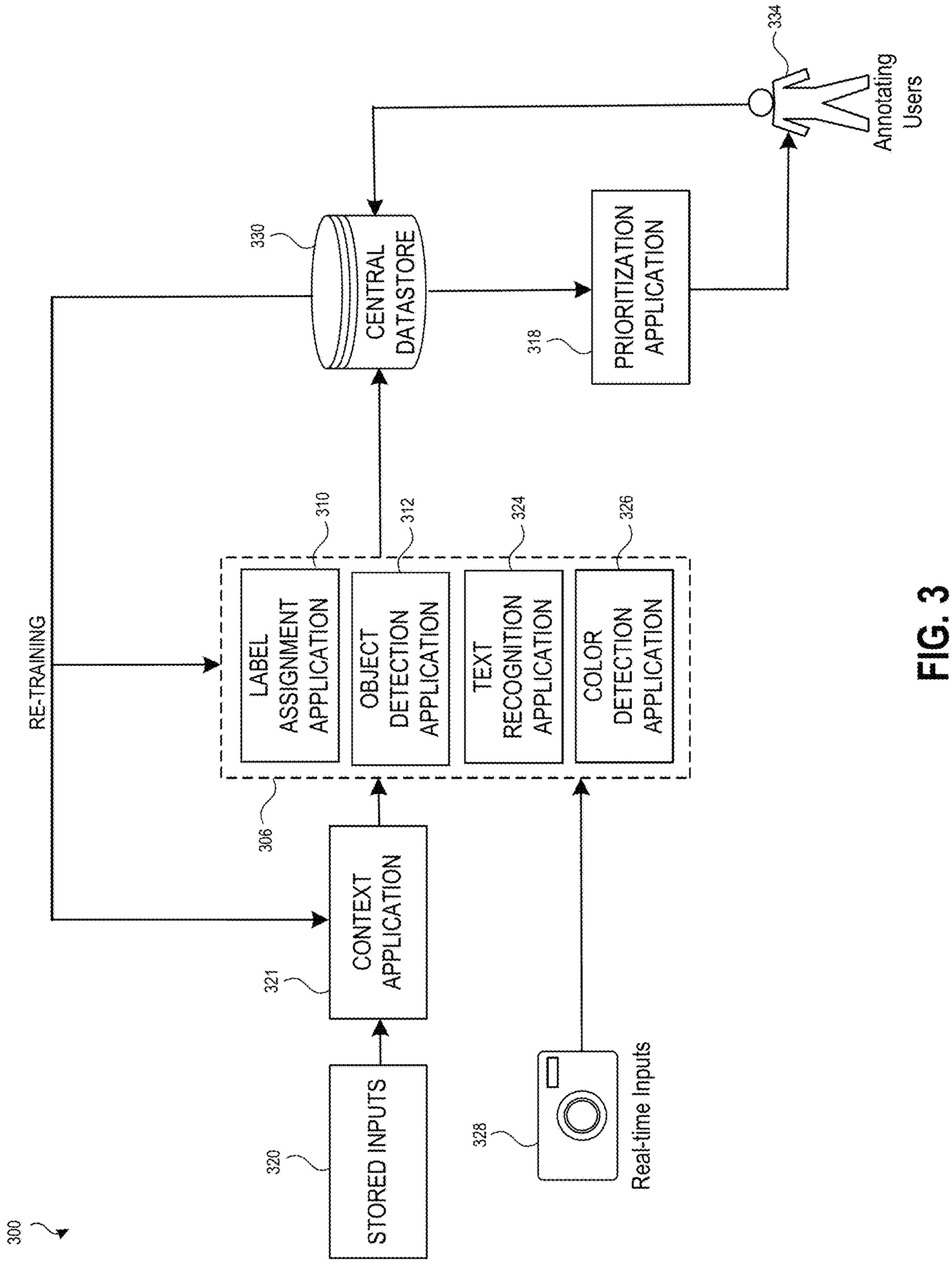
FIG. 3 illustrates example data annotation and model training platforms of the system of FIG. 1.

FIG. 3 illustrates example data annotation and model training systems 300 of the system of FIG. 1. Such processes are further described in U.S. patent application Ser. No. 18/069,913, "IMAGE DATA ANNOTATION AND MODEL TRAINING PLATFORM," which is incorporated by reference in its entirety.

In some examples, one or more stored input data files (for example, vision data such as images, videos, or other files as stored in stored inputs database 120), which may or may not have associated context may be provided from stored inputs 320 to context application 321 (for example, a context application that is included within an application of the data management platform 212 or data collection platform 206 of FIG. 2). Example contexts for received images, in the example where the enterprise is a retail enterprise, may include a specific store shelf image, a product image within a particular product category (or each product category), an image of customer or worker traffic at a retail location or warehouse, an image of a scene including products used in context, third party customer images received by the retail enterprise, a parking lot, a road, a walkway, a retail aisle, and the like. Each context classification may be mapped to one or more annotation models that may subsequently be employed to annotate the image consistent with the model trained in the specific context (e.g., to identify specific objects or products likely to appear within that context).

At annotation models 306, depending on a confidence of the context classification, the images and associated context may be provided to two or more such annotation models, to determine an ultimate confidence of annotations from each model to obtain a final context and annotation set for the given image. In other examples, one or more images which have a pre-associated context (for example, a camera that is associated with a particular location or item) may be provided from real-time inputs 328 to annotation models 306 directly.

In some examples, annotation models 306 are context-specific. In some examples, label assignment application 310 will assign general or specific annotations/labels/tags, based at least in part on the context associated with the image. As noted above, a context may correspond to a specific expected viewpoint of one or more images, or one or more expected types of objects that may appear within the images. Alternatively, a context may simply relate to a set of items or item types that are expected to appear within a common image. In some examples, object detection application 312 may identify one or more objects (in some examples, enterprise products may also be identified) in the image, based at least in part on the context associated with the image. In such instances, detection of a particular item within an image at a high confidence, as well as a classification of the image into a context, may assist with detection of other objects or item types appearing within the same image based on a likelihood of common appearance of two items/objects.

In some examples, text recognition application 324 may also identify one or more texts in the image, based at least in part on the context associated with the image. For example, a context may improve accuracy of text detected, since some text may be modeled as being more or less likely to appear in a given context. In some examples, color detection application 326 may identify one or more colors in the image, based at least in part on the context associated with the images.

In some examples, annotations (labels, tags) are assigned to the images by one or more of the annotation models 306. Annotated images may be stored in central database 330 (for example, central datastore 130). Annotations may include the identified characteristics or contents of each image, as well as an associated confidence in the labeling or annotation that identifies the specific characteristics or contents. Annotations may include labeling an image, or a region of an image, alongside one or more labels attached thereto. The labels attached via the annotation models 306 may include, for example, item identification labels that uniquely identify an item from within a retail item database as appearing in the image.

In some examples, prioritization application 318 (for example, an application of data management application 212) determines whether annotated images include acceptable annotations (for example, annotations which are complete and accurate) and which images include unacceptable annotations (for example, missing annotations or annotations which are incomplete and/or inaccurate), based off of enterprise factors. Enterprise factors may include, in some examples, business considerations, safety factors relating to safety of enterprise employees/agents/guests, number of enterprise guests visiting a retail aisle in a given period of time, empty shelves determined, scene/background, accuracy requirements, environmental factors, image clarity/quality, lighting, camera functionality, confidence level of assigned annotations, or others.

In some examples, in addition to determining whether images require further annotation, prioritization application 318 may determine a priority order (also based on the enterprise factors) in which the images should be further annotated. Images requiring further annotation may be assigned to a position in a queue, based on the priority and, in some examples, other workload considerations.

In some examples, an annotating user 334 may add additional annotations (or may modify or remove existing annotations) to the images, based on the determinations by prioritization application 318. In some examples, annotating user 334 may add additional annotations to images which are placed in an earlier position in the queue before adding additional a later position in the queue. Images annotated by annotating user 334 may be stored in central database 330.

In some examples images with acceptable annotations (either which were acceptable after being annotated by annotation models 306 or which are acceptable after further annotation by annotating user 334) and are stored in central database 330, may be used to train or re-train context application 304 and any or all of annotation models 306.

Figure 4:
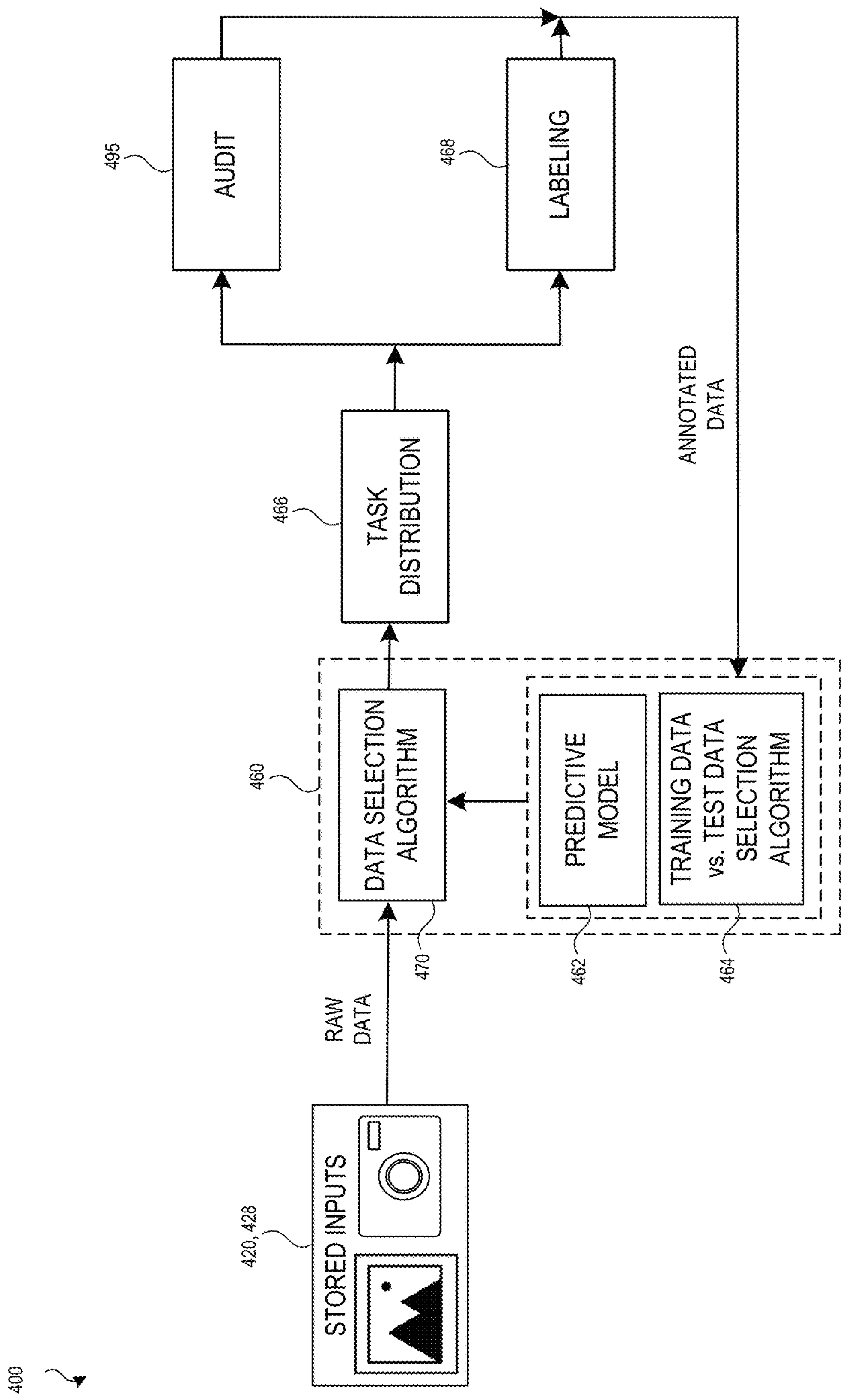
FIG. 4 illustrates an example machine learning platform of the system of FIG. 1.

FIG. 4 illustrates an example machine learning platform 400 of the system of FIG. 1. Stored inputs 420 (for example inputs such as those stored in stored inputs database 120), 428 (for example, those such as real-time inputs 128) that are to be annotated/labeled are received at an active learning application 460 (for example, including active learning model 260) as "raw data." These stored inputs 420, 428 may also include metadata, including context. The raw data is automatically annotated at the active learning model 460. Each annotation includes a prediction of accuracy from the model 460. The annotated data is presented to a data selection algorithm 470, which determines to present the data to the task distribution application 466. From task distribution application 466, data is sent either for audit at audit application 495 (for data which includes a high accuracy prediction), or for further annotation (for example, further automatic/ML or manual annotation for data that includes a low accuracy prediction) at annotation/labeling application 498. The annotated/re-annotated data then passes back to active learning application 460. Based on the annotated data, training data vs. test data selection algorithm 464 determines whether the active learning annotation model should be run with test data, or whether it should be re-trained using test data sets. Predictive model 462 generates predictions of the accuracy of the annotations generated by the active learning model.

The platform 400 includes an iterative process, where the data with low accuracy predictions is cyclically re-annotated to have a higher accuracy, the active learning model is re-trained based on that higher accuracy information, and the updated active learning model is used to annotate data, which are assigned their own accuracy predictions.

FIG. 5 illustrates an example method 500 for annotating images at a vision data platform, for example, vision data platform 202. At operation 502, input vision data may be received (for examples, at a data collection application) from a plurality of tenants. The input data may include a plurality of vision data files. The vision data files may be associated with or received from a plurality of heterogeneous vision data capture contexts associated with the plurality of tenants. The plurality of vision data files may each have associated metadata. In some examples, the input vision data files may comprise image data, video data, or other relevant types of media data as described herein. In some examples, data collection application comprises a tenant API configured to communicate with the one or more tenants.

In some examples, plurality of tenants includes enterprise vision data collection tenants that may provide image data to the disclosed systems, and enterprise vision data consumption tenants that may received annotated data from the disclosed systems. In some examples, a tenant may either receive or provide image data, or may both receive and provide image data.

In some examples, the associated metadata includes a security requirement associated with the tenant from which the input media was received. The security requirements associated with a particular input data file may be associated with the tenant from which that file was received/the tenant with which that file is associated, or with one or more tenants with which the files may be shared after the file is annotated in later operations.

In some examples, the input vision data is received at an access interface application (for example, multi-tenant access application 204) including one or more tenant APIs configured to communicate with the plurality of tenants, the access interface application including a data collection interface and a data access interface (for example, data collection application 206 and data access application 210). The data collection interface may be configured to obtain input vision data from the enterprise vision data collection tenants that are operating in the plurality of heterogeneous vision data collection contexts.

At operation 504, the input data from each of the plurality of tenants is processed at a data collection application. The data collection application may be, in some examples, data collection application 206 of a multi-tenant access application 204 as described above. The input data may be received in real time or in bulk updates, or both, depending on the specific type and application to which the vision data is directed.

At operation 506, the input data from each of the plurality of tenants is stored in a common central database. The common central database may be maintained by the data store 230 of FIG. 2, in example implementations. The metadata associated with the input data files (including the associated security requirements) is stored in the common central database along with the input data files. In some alternative embodiments, security requirements may be maintained in memory and associated with particular tenants and/or users, data sources or data types, and the like.

In some examples, the stored input data from the central database is accessed by a data management application. In example implementations, one or more subsets of stored input data may be accessed by the data management application 212, such as is shown in FIG. 2. In alternative examples, the data management application receives a reference to such data and/or subsets of data, allowing for access to the input data from a variety of other applications internal and/or external to the vision data platform, e.g., an annotation application or other external vision data consumer applications.

At operation 508, an annotation request associated with each relevant file of the input data is generated at the data management application. The annotation request may include/identify the file and associated metadata. In some examples, at the data management application, a priority associated with each annotation request is determined. In some examples, priority may be determined, at least in part, based on a change associated with an object or source of the input vision data. For example, if the vision data is sourced from a particular camera, and the view of that camera has been altered, the annotations from that camera may be assigned a higher priority.

At operation 510, the annotation request is received at a vision data enrichment application (for example, vision data enrichment application 244). In some examples, the annotation request is received at a machine learning platform (for example, active learning application 260) within the vision data enrichment application.

In some examples, the vision data enrichment application includes a predictive annotation application (for example, active learning application 260) and one or more manual annotation applications (for example, annotation tools 293). The predictive annotation application may include a plurality of predictive models (e.g., machine learning models) that are operable to predict annotations in an associated at least one of the heterogeneous vision data collection contexts.

At operation 512, each file is annotated (at the vision data enrichment application) according to the associated annotation request. Annotating each file may include updating the metadata associated with each file. In some examples, annotation is performed in accordance to a determined priority. In some examples, annotation is performed at a machine learning model that was trained using a training data set (the training data set may include previously manually or automatically annotated data). Annotation may include object recognition, object classification, text recognition, or others.

At operation 514, each annotated file is stored in the central database, where each annotated file is associated with the security requirement of the originally input un-annotated file. In examples, the annotations included correspond to metadata associated with each file, and storing the annotated file corresponds to storing additional or updated metadata in the central database alongside the stored vision data. Such new metadata may be used, alone or in conjunction with the vision data, in subsequent display and/or retraining applications associated with models hosted at or associated with the vision data platform. The stored metadata may still include the associated security requirement.

In some examples, each annotated file and its associated security requirement may be accessed by the data access application. In some examples, data access application comprises a tenant API (for example, API 211) configured to communicate with one or more tenants. In some examples, the security requirement is included in the metadata associated with the file. For example, a file may be originally received at the system, that has a particular security requirement. When the file is annotated and its metadata updated to include annotations (or, in some examples, to include additional or alternate annotations), the security requirement in the metadata may remain the same for the file. This ensures that access, privacy, and permissions remain the same for the file in both its pre-annotation and post-annotation state.

In some examples, at operation 516, a request from a tenant (of the plurality of tenants 240) to view an annotated file is received. In some examples, the request from the tenant may include a request to view, receive, download, edit, or otherwise receive or interact with the annotated file. In some examples, the request of the tenant to view the annotated file is managed at an enterprise data management application that exposes the API accessible to the access interface application. The enterprise data management application manages access to the common central database for the vision data enrichment application and the data access interface of the access application.

In some examples, at operation 518, based on the security requirement for the requested annotated file, the annotated file may be provided to the requesting tenant. In some examples, the requesting tenant is the tenant that provided the associated input data. In some examples, the requesting tenant is a different tenant than the one that provided the associated input data. In some examples, based on the security requirement for the requested annotated file, the annotated file may not be provided to the requesting tenant. In some examples, based on the security requirement for the requested annotated file, the annotated file may be provided only to the requesting tenant, and not to other tenants. Based on the security requirement for the requested annotated file, the annotated file may be to any or all of the plurality of tenants. In some examples, based on the security requirement for the requested annotated file, the annotated file may be provided to a selected subset of the plurality of tenants.

In some examples, the access interface application receives feedback from at least some of the plurality of tenants regarding accuracy of annotations provided by the vision data enrichment application in one or more of the heterogeneous vision data collection contexts. Upon receipt of this feedback, the access interface application may initiate updates to training of the predictive annotation application (for example, re-training of machine learning models of the predictive annotation application), wherein initiating updates to training of the predictive annotation application initiates creation of training data via the manual annotation application.

In some examples, the input vision data includes a self-edge view of a first plurality of products on an enterprise shelf. Annotating these images may include identifying one or more products on the shelf. A planogram may be received that corresponds to the shelf and may depict a second plurality of objects. Based on the planogram, one or more differences between the first plurality of products and the second plurality of products may be identified.

Figure 6:
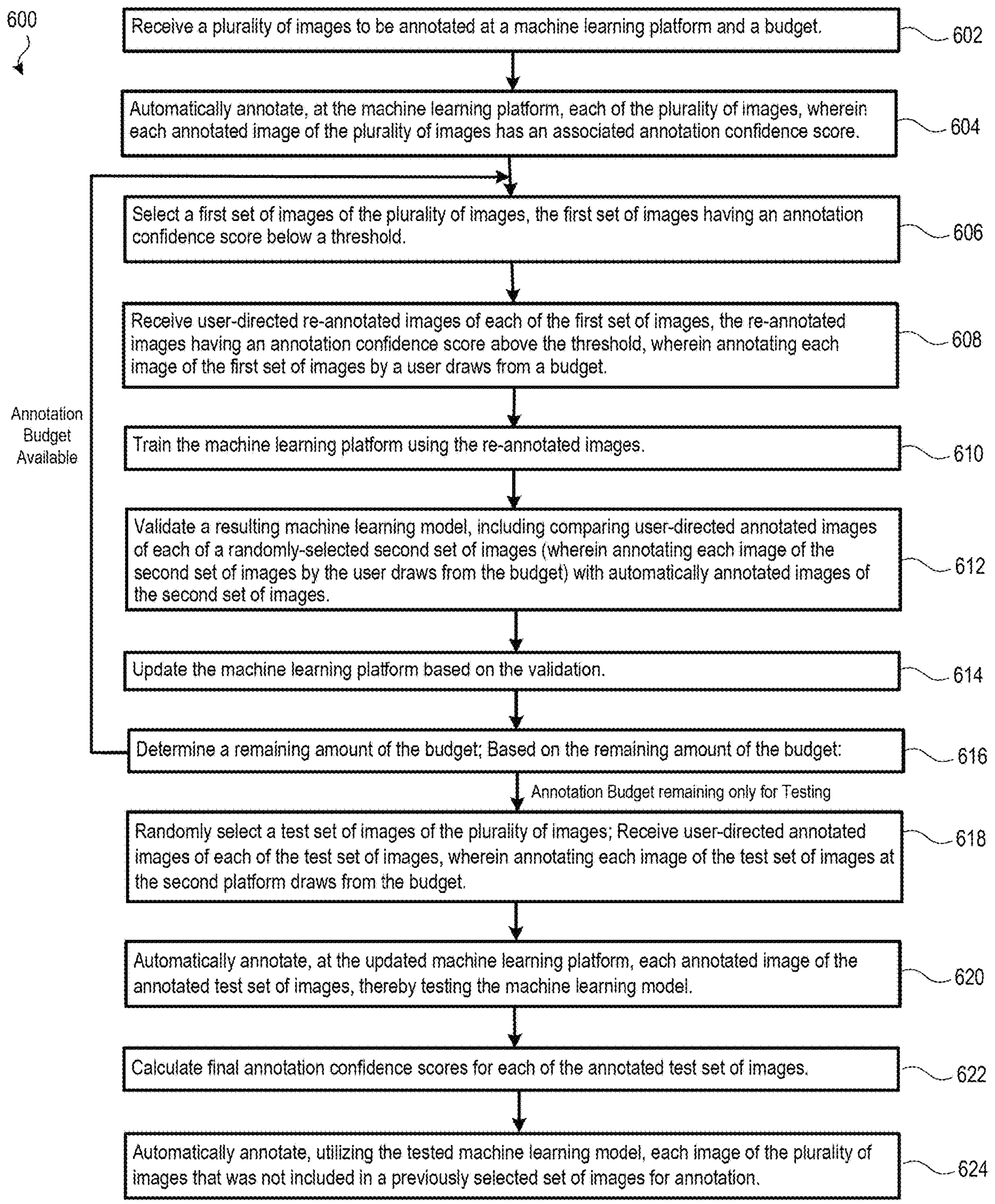
FIG. 6 illustrates an example method for annotating a plurality of images at a machine learning platform, according to an example.

FIG. 6 illustrates an example method 600 for annotating a plurality of images at a machine learning platform of a vision data platform (for example, active learning application 260 of vision data platform 202). At operation 602, a plurality of images to be annotated are received at a machine learning platform. In some examples, the machine learning platform may have been initially trained using a training data set that included annotated image data. In some examples, the plurality of images represents a set of images of a plurality of sets of images, wherein each set of images and/or each image within each set of images has an annotation priority. In some examples, images may include image files, video files, or other related filetypes as described herein. In some examples, the machine learning platform is configured to generate an object recognition, object classification, and/or text recognition machine learning model.

At operation 604, at the machine learning platform, each of the plurality of images are automatically annotated. Each annotated image of the plurality of images is assigned an associated annotation confidence score. In some examples, each of the plurality of images has an associated context, and the automatic annotation may be based at least in part on the context. The automated annotation may be performed using a machine learning model, for example, which is specific to the context associated with the images that are received. That is, in such examples, a machine learning model, such as a machine vision model, At operation 606, a first set of images of the plurality of images is selected, the first set having an annotation confidence score below a threshold. In some examples, the first set of images is of a lesser quantity than the plurality of images. In examples, the threshold may be a normalized value within a range of expected annotation confidence scores. For example, in some embodiments, a threshold may be set at 0.9, 0.95, or the like, indicating high confidence of annotation. In other examples, the threshold may segment a group of images to indicate that the first set of images is a group of the bottom predetermined percentage of image annotation confidence (e.g., a bottom 10-20% of image annotation confidence scores). Other thresholding techniques may also be applied.

At operation 608, user-directed re-annotated images of each image of the first set of images are received. The re-annotated images have associated annotation confidence scores above the threshold. Annotating each image of the first set of images by a user draws from a budget. The budget may represent, for example, overall user and/or compute system effort required to re-annotate images, and may be determined in terms of a number of person-hours required for such annotation. The budget may be selected, for example, based on an importance of the particular annotation and/or model (e.g., based on context). For example, a model detecting out of stock items on a shelf may have comparatively lower importance than a model used to identify potential item shoplifting at a self-checkout, so a higher budget for annotation training data may be used in the self-checkout context. Similarly, a higher or lower required confidence score may be selected in operation 606 depending on context. User-directed annotated/re-annotated images may be received from an annotation tool operated by an annotation user via an annotation user interface.

At operation 610, the machine learning platform is trained using the re-annotated images. Training the machine learning platform may include training a context-specific model with newly available training data obtained from the manual and/or machine annotations. In some examples, more than one model may be trained or retrained using the re-annotated images. The one or more models that are trained may be associated with the same context, or may have different contexts (e.g., a shelf edge image useable to recognize an image of a product at a predetermined location, or another camera image useable to recognize an image of the same product in different locations or contexts).

At operation 612, the resulting machine learning model is validated. Validation may include randomly selecting a second set of images out of the plurality of images. User-directed annotated images of each of the second set of images are received (for example, from a manual annotation). These user-directed annotated images of the second set of images may be designated as a validation set. Annotating each image of the second set by the user further draws from the budget. In some examples, the second set of images is lesser in quantity than the plurality of images. The second set of images is also automatically annotated by the now-trained machine learning model. The automatically annotated second set of images are compared against the user-directed annotated second set of images (i.e., the validation set) to determine operating behavior of the model that is has been (re)trained.

At operation 614, the machine learning platform is updated based on the model validation, e.g., to indicate that the selected models are validated, and/or to select an appropriate validated model for use.

At operation 616, a remaining amount of the budget is determined.

In some examples, if it is determined that the remaining amount of budget indicates that the budget is sufficient to further train and validate the machine learning model, prior to selecting a test set of images at operation 618, a third set of images of the plurality of images is selected. The third set of images is of lesser quantity than the plurality of images, and the third set of images may have a confidence score below the threshold.

In some examples, user-directed annotated images of each of the third set of images are received, the re-annotated images having a confidence score above the threshold. Annotating each image of the third set of images by the user further draws from the budget. The machine learning platform may be re-trained using the re-annotated images. A fourth set of images of the plurality of images may be randomly selected, the fourth set of images being lesser in quantity than the plurality of images. User-directed annotated images of each of the fourth set of images may be received, the annotated fourth set of images being designated as a second validation set. Annotating each image of the fourth set of images by the user further draws from the budget. The resulting machine learning model may be validated using the second validation set. The machine learning platform may be updated based on the validation. It may be determined that the remaining budget includes only a quantity of budget sufficient to annotate a test set of images.

At operation 618, based on the remaining amount of the budget, a test set of images is randomly selected from the plurality of images. User-directed annotated images of each of the test set of images may be received. Annotating each image of the test set of images at the second platform draws from the budget.

At operation 620, each annotated image of the annotated test set of images is automatically annotated at the updated machine learning platform, thereby testing the machine learning model. In examples where the annotation budget is not yet exceeded, further sets of test images may be randomly selected for further user annotation and retraining in accordance with the steps described above. Once an annotation budget has been met, in some instances, this retraining process may be completed, and operational flow may proceed to operation 622.

At operation 622, final annotation confidence scores for each of the annotated test set of images are calculated. The final annotation confidence scores may correspond to confidence scores which are above a predetermined threshold for at least a minimum number of images within an image data set.

At operation 624, each image of the plurality of images that was not included in a previously selected set of images for (manual or automatic) annotation are automatically annotated, utilizing the tested machine learning model at the machine learning platform.

Figure 7:
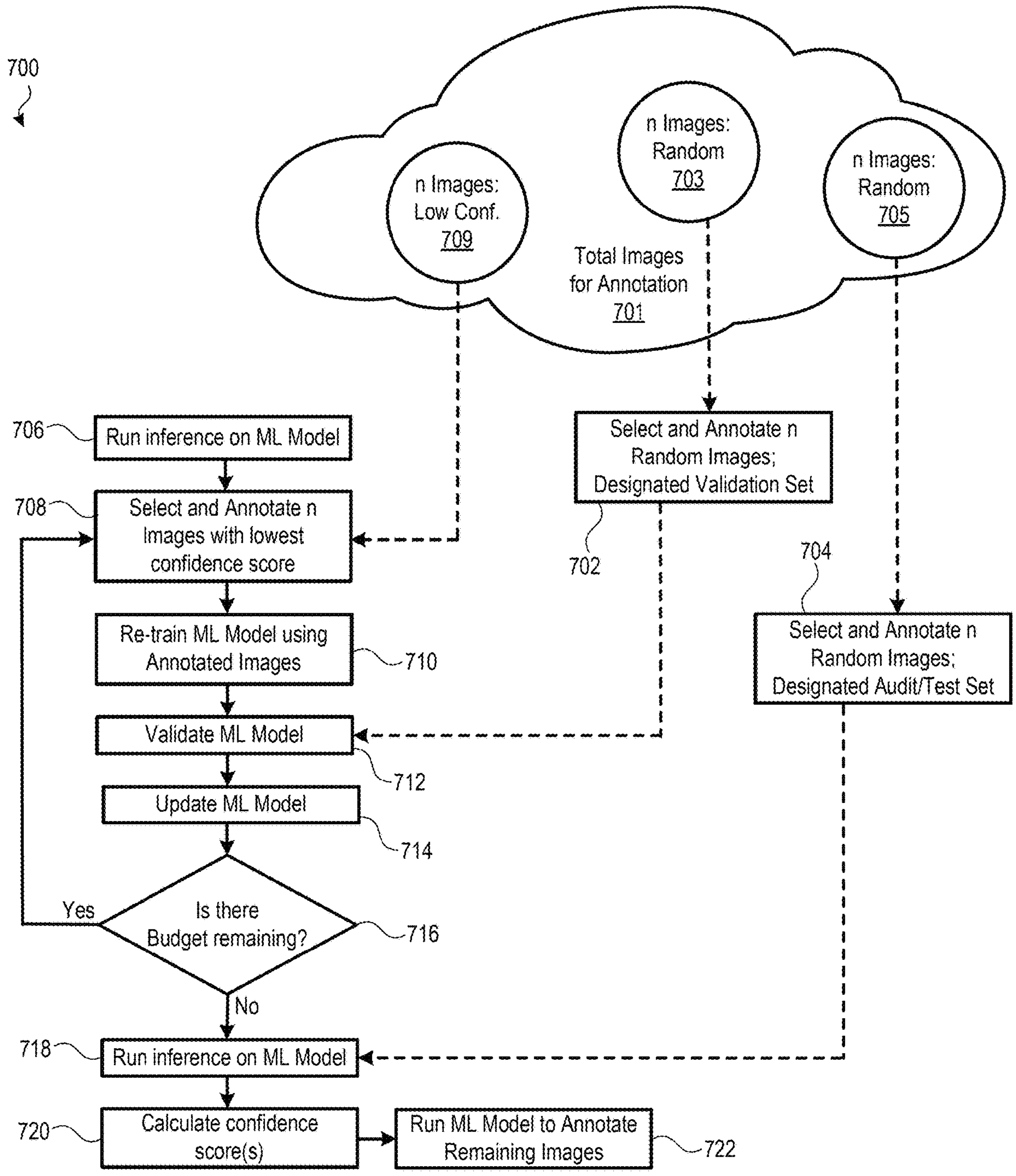
FIG. 7 illustrates an example flowchart for running, re-training, and validating a machine learning model of the system of FIG. 1.

FIG. 7 illustrates an example flowchart 700 for running, re-training, and validating a machine learning model of the system of FIG. 1. The flowchart 700 may represent a possible method of performing batch annotation of training data and retraining of contextual machine learning models in accordance with example embodiments of FIG. 6, in the context of the vision data platform described herein.

In the example as illustrated, a plurality of a total number of vision data files 701 are identified that need to be annotated. Throughout FIG. 7 and its description, vision data will be referred to as "images," however, this term may include any vision data type as described above. An enterprise may have a team of annotating users that may manually annotate images using annotation tools via an annotation user interface. However, it can be costly to sufficiently staff a team large enough to annotate many images (for example, a large number of vision data files 701). In such situations, it may be beneficial to utilize a machine learning model for annotation tasks. The machine learning model may be trained in a way that keeps manual annotation costs within a predetermined budget, and that generates a model that can annotate large numbers of images quickly and accurately.

A request to annotate a set of images for annotation 701 may be received, as well as a budget for the annotation of the images (i.e. a budget for manual/user-directed annotation of the images).

At operation 706, inference is run on a machine learning model (for example, active learning model 260), and all of the total images for annotation 701 are automatically annotated by the model. A confidence score (for example, an accuracy prediction) is also calculated for the annotation of each image.

At operation 708, a number n of images 709 of the total annotated images 701 are selected. The selected n number of images 709 are selected based on having low confidence scores (for example, a confidence score below a predetermined threshold, or a confidence score below a predetermined percentage of the overall confidence scores (e.g., in the bottom 10% of scores, etc.).

The n number of images 709 are annotated at a separate system, for example, by manual/user-directed annotation by an annotating user via an annotation tool on a user interface. This manual annotation utilizes a part of the predetermined budget.

At operation 710, the machine learning model is re-trained using the annotated n number of images 709. In this retraining process, the re-training of the machine learning model may use the annotated n images, and may also use other training data, such as previously annotated image data, or automatically annotated images that have high confidence scores associated with the predicted annotations generated by the machine learning model.

At operation 702, an m number of images 703 of the total annotated images 701 are randomly selected. The random n number of images 703 are annotated at the separate system; the annotated m number of images 703 are designated as a validation set of images. This manual annotation utilizes a part of the predetermined budget. The manual annotated images 703 may be designated as a validation set. The random n number of images 703 are also annotated automatically by the re-trained machine learning model.

At operation 712, the annotated validation set of images are utilized to validate the machine learning model. Validation of the machine learning model may include, comparing the model-generated annotations of the n number of images 703 to the manual/user-directed annotated images (the validation set) to determine correspondence. In the case of high correspondence, the model may be considered validated, as it generates expected results. In the case of low correspondence, the model may be considered to be inadequately trained, and unreliable. As such, further training may be required, or a different model might be selected for use for the particular context.

Once validated, the machine learning model is then updated at operation 714, based on the validation. This may include replacing an existing model with a re-trained model, or otherwise updating the model that is used for automatic or machine learning-based annotation.

At operation 716, the budget is evaluated to determine how much "budget" (e.g., allocated manual effort budgeted to be expended on the annotation process) remains. If only enough remains to manually annotate a test set (as will be described below), then the process moves to operation 704/718. If enough remains to repeat operations 708 and 702, then steps 708 through 716 are iteratively repeated to further increase the accuracy of the annotations generated by the machine learning model. This iteration may continue until it is determined that only enough remains to manually annotate a test set (as will be described below), then the process moves to operation 704/718.

At operation 704, an n number of images 705 of the total annotated images 701 are randomly selected. The random n number of images 705 are annotated at the separate system; the annotated n number of images 705 are designated as a test set or audit set of images. This manual annotation utilizes a part (in some examples, the remaining part) of the predetermined budget.

At operation 718, inference is run on the machine learning model, using the annotated test set of images; the test set of images are annotated by the machine learning model. Confidence scores for the model-annotated test set of images are calculated at operation 720.

At operation 722, the remaining images of the total images for annotation 701 (that is, images that were not annotated as part of n images 709, n images 703, or n images 705) are annotated by the machine learning model.

In some examples, randomly selected n number of images 703 and 705 may be selected prior to performance of operation 706. In such an example, manual/user-directed annotation operations 702 and 704 (to generate the validation set and audit/test set, respectively) may also be performed prior to performance of operation 706, and thus the amount of budget that those steps cost will be spent before the performance of operation 706. If this occurs, at operation 716, if there is not enough budget remaining to repeat operation 708, then operation 718 is performed. If enough budget remains to repeat operation 708, then steps 708 through 716 are iteratively repeated to further increase the accuracy of the annotations generated by the machine learning model. This iteration may continue until it is determined that there is not enough budget remaining to repeat operation 708, and the process moves to operation 718.

Figure 8:
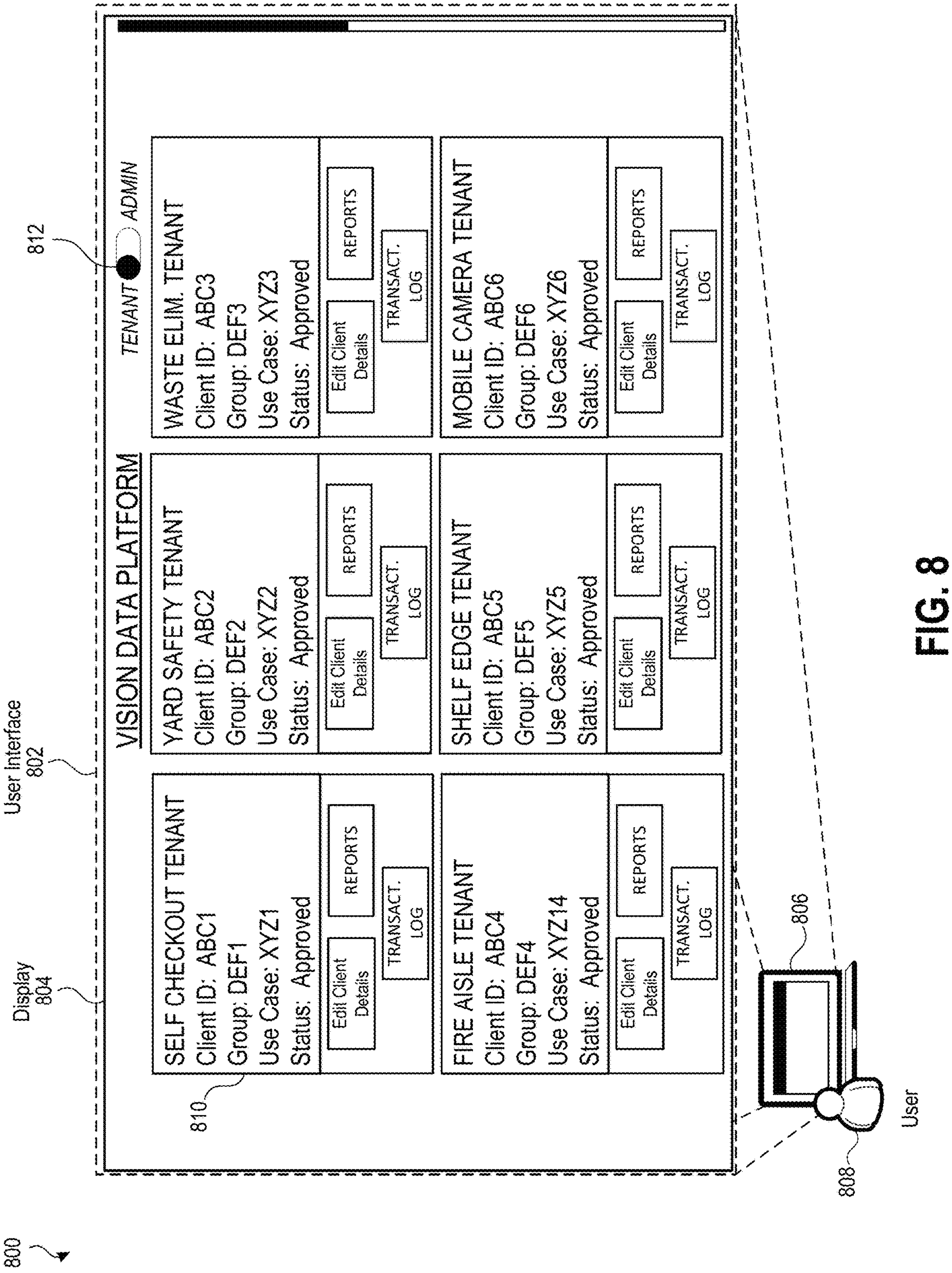
FIG. 8 illustrates an example dashboard user interface for a vision data platform, according to an example.

FIG. 8 illustrates an example dashboard user interface 800 for a vision data platform. In an example, a vision data platform dashboard user interface 802 is displayed via a display 804 (for example, a screen, touchscreen, etc.) of device 806. In some examples, user 808 may be a tenant user (for example, tenant user 140) or an administrator user (for example, administrator user 134). In some examples, user interface 802 may provide user 808 with summary data relating to each of a plurality of tenants and associated vision data. Information 810 associated with each tenant may include an identification number or name, associated groups or teams, use cases, status, and/or other relevant information. Also provided for each tenant's information 810 may be options to edit client/tenant details, view or create reports, and/or logs of transactions. A toggle 812 or other means for interaction may be presented for switching the user interface 802 from a tenant mode to an administrator mode. The information 810 and/or options presented may differ based on the selected tenant or administrator mode, and certain users may only have access to certain modes or certain features, information, or options within a mode.

Figure 9:
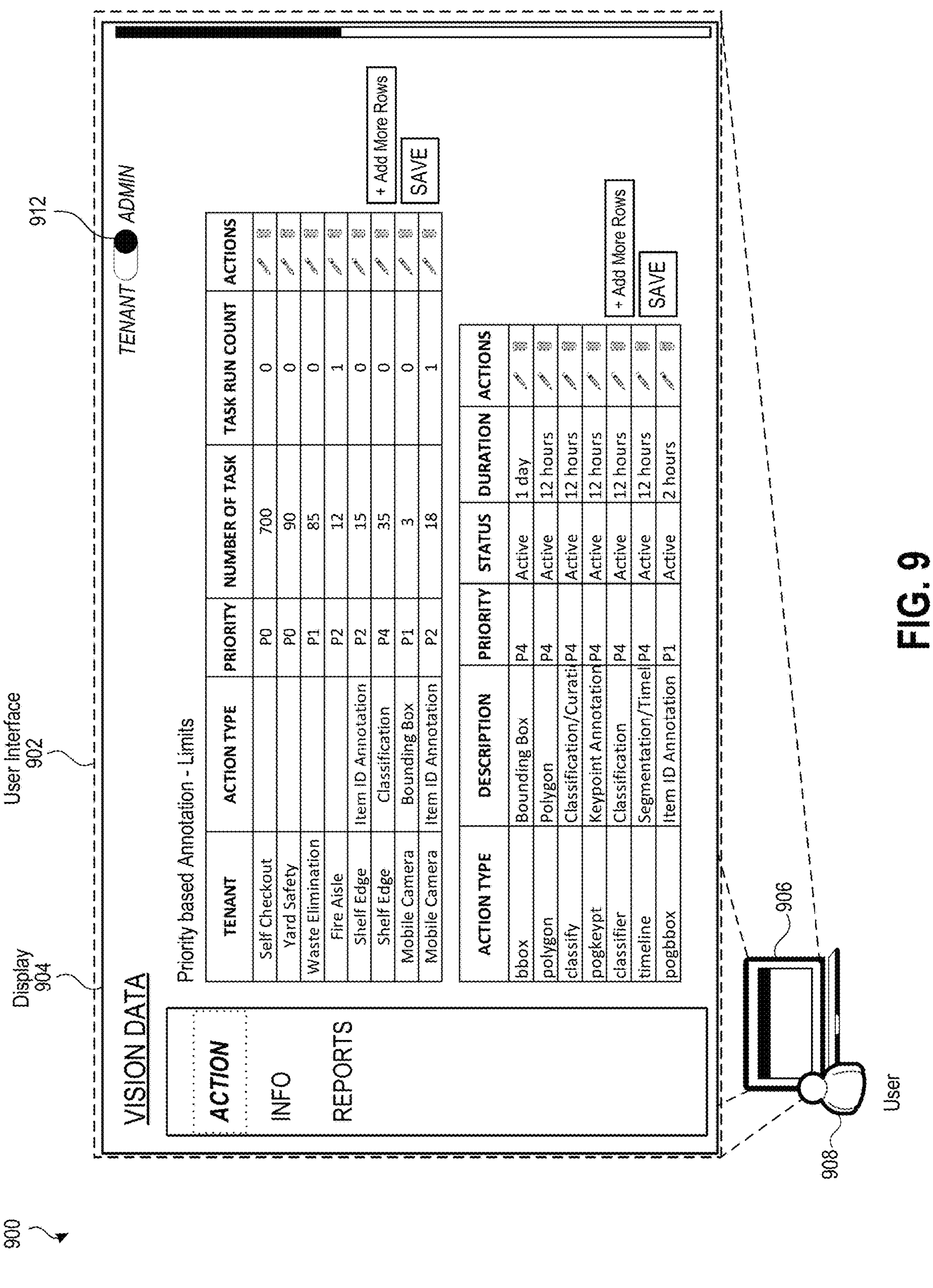
FIG. 9 illustrates an example user interface for a vision data platform, according to an example.

FIG. 9 illustrates an example user interface 900 for a vision data platform. In an example, a vision data platform annotation summary user interface 902 is displayed via a display 904 (for example, a screen, touchscreen, etc.) of device 906. In some examples, user 908 may be a tenant user (for example, tenant user 140) or an administrator user (for example, administrator user 134). In some examples, user interface 902 may provide user 908 with summary data relating to each of a plurality of vision data annotation tasks. Information provided for each task may be arranged in graphs, charts, tables, lists, matrices, or another suitable format. Information provided may be organized by tenant, and may include action type, assigned priority, number of task, and a run count. For each, options may be provided for the user 908 to edit or remove/delete/cancel a task. Options also may be provided for the user 908 to save a current status and/or add more rows/information. Information may be organized by task, and may include action type, description of annotation type, assigned priority, and/or duration of task. For each, options may be provided for the user 908 to edit or remove/delete/cancel a task. Options also may be provided for the user 908 to save a current status and/or add more rows/information. A toggle 912 or other means for interaction may be presented for switching the user interface 902 from a tenant mode to an administrator mode. The information and/or options presented may differ based on the selected tenant or administrator mode, and certain users may only have access to certain modes or certain features, information, or options within a mode.

In some examples, user 908 may interact with the user interface 902 in ways other than those described above regarding the provided options. Interactions may include modification of graphs or tables, sorting or filtering data, requesting calculations of a new metric, requesting a new assessment, or initiating an action. Data shown and options presented may be dependent upon which of a tab is selected by user 908, for example, whether an action tab, information tab, or reports tab is selected.

Figure 10:
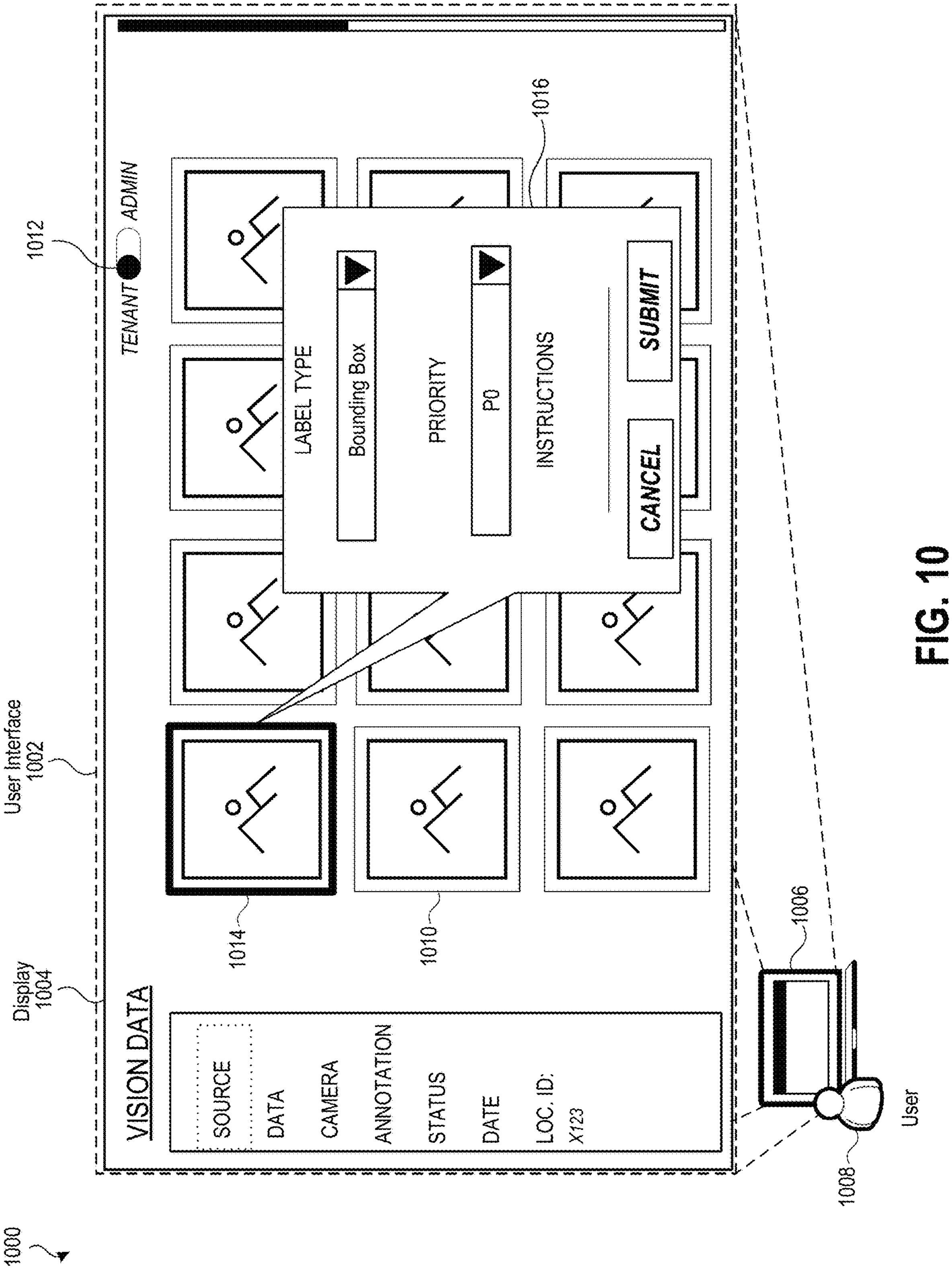
FIG. 10 illustrates an example annotation selection user interface for a vision data platform, according to an example.

FIG. 10 illustrates an example annotation selection user interface 1000 for a vision data platform. In an example, a vision data platform annotation selection user interface 1002 is displayed via a display 1004 (for example, a screen, touchscreen, etc.) of device 1006. In some examples, user 1008 may be a tenant user (for example, tenant user 140) or an administrator user (for example, administrator user 134). In some examples, user interface 1002 may provide user 1008 with depictions (for example, lists, icons, or thumbnails) 1010 relating to vision data files (for example, images or videos) that the user 1008 may desire to have annotated. A user 1008 may select a file depiction 1014, and options 1016 may be presented to user 1008 (for example, as a callout, pop-up, or separate window). Options may include a selection of a label/annotation type, priority assignment, and/or other instructions for annotation. Options may be submitted or canceled once edited. Options may be selected via interaction means such as drop-downs, radio buttons, buttons, toggles, text boxes, or other appropriate interaction methods. Once annotation options are selected, the file may be provided to a vision data platform, may be annotated automatically by a machine learning model, and/or may be manually by an annotation user via an annotation tool.

A toggle 1012 or other means for interaction may be presented for switching the user interface 1002 from a tenant mode to an administrator mode. The depictions 1010 and/or options presented may differ based on the selected tenant or administrator mode, and certain users may only have access to certain modes or certain features, information, or options within a mode. Data shown and options presented may be dependent upon which of a tab is selected by user 1008, for example, whether a source tab, data tab, camera tab, annotation tab, status tab, date tab, or location tab is selected.

Figure 11:
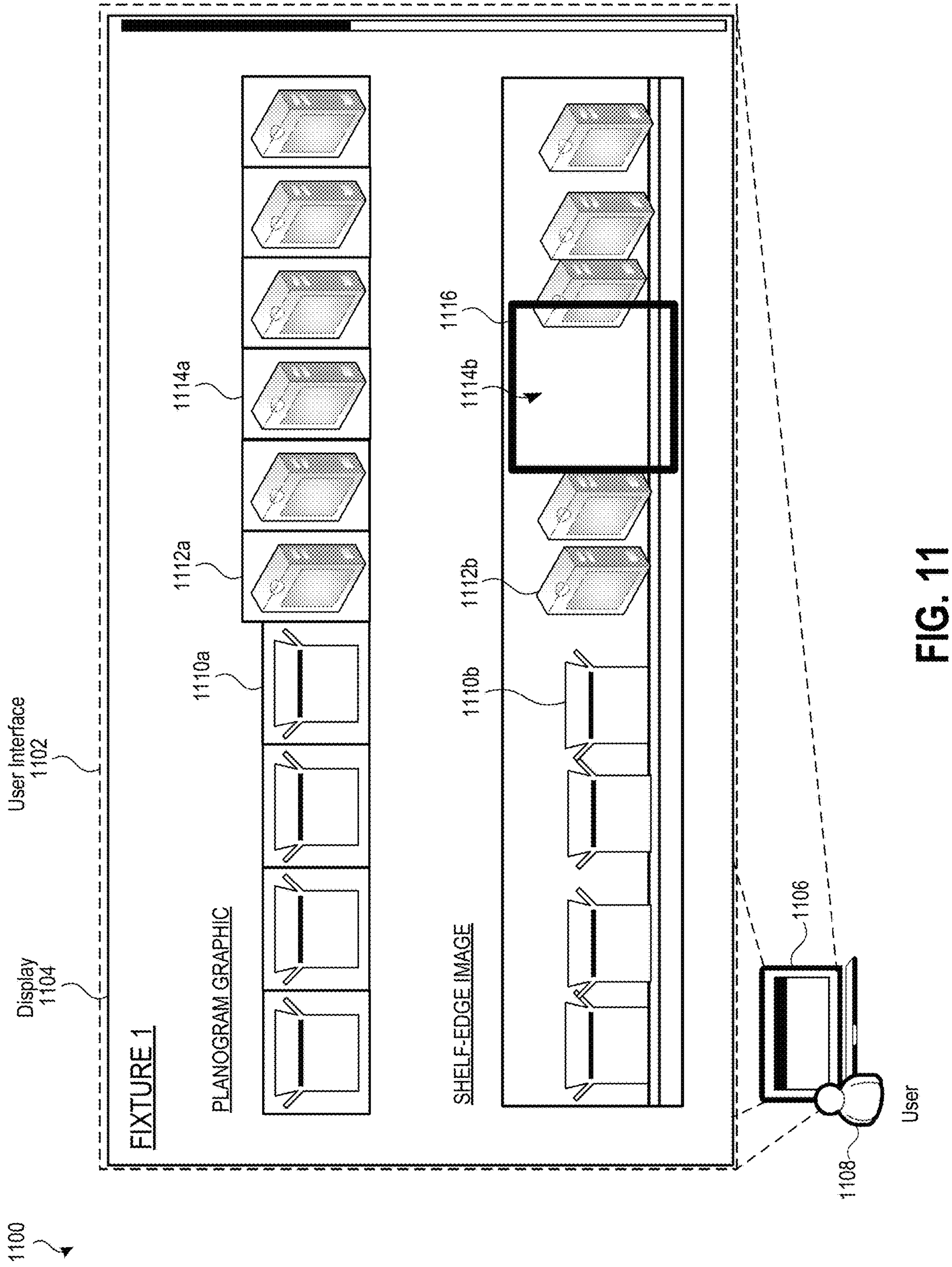
FIG. 11 illustrates an example planogram user interface for a vision data platform, according to an example.

FIG. 11 illustrates an example planogram user interface 1100 for a vision data platform. In a particular example, a tenant of an enterprise desires to monitor store shelves to determine whether items are out of place or out of stock. The enterprise may utilize planograms to plan product layouts. The enterprise may have shelf-edge cameras to gather vision data relating to the status of products on various shelves. The shelf-edge vision data (for example, images or video from the shelf-edge cameras) may be received at and processed by a vision data platform as described herein.

An annotation platform (for example, a trained machine learning model) may compare a planogram graphic with a shelf-edge data file. As a series of shelf-edge data files captured of the same shelf over a time period are compared with each other (and, in some examples, with the associated planogram graphic), the machine learning model may define a background of the shelf-edge data files to me a fully-stocked shelf. A foreground may be defined as a change from the background, including an empty slot on the self 1114*b* or a misplaced item from another shelf placed errantly on this shelf. In some examples, noise may be filtered out of the shelf-edge data files by the machine learning models. For example, a misplaced item on the shelf or a person walking past the shelf may be identified as noise.

The planogram and shelf-edge data may both determine that items 1110*b* and 1112*b* are in their proper locations on the shelf when compared to 1110*a* and 1112*a*, respectively. However, it may be determined that item 1114*b* is missing (for example, misplaced or out of stock) from the shelf as compared to item 1114*a*. Item recognition may be performed by object recognition, categorization, text recognition, bar code recognition, or another type of identification. Shelf-edge data gathering and processing is further discussed in U.S. patent application Ser. No. 17/681,491, "RETAIL SHELF IMAGE PROCESSING AND INVENTORY TRACKING SYSTEM," incorporated herein in its entirety, and in U.S. patent application Ser. No. 17/681,470, "RETAIL SHELF IMAGE PROCESSING AND INVENTORY TRACKING SYSTEM," also incorporated herein in its entirety.

Example planogram user interface 1102 may be displayed via a display 1104 (for example, a screen, touchscreen, etc.) of device 1106. In some examples, user 1108 may be a tenant user (for example, tenant user 140) or an administrator user (for example, administrator user 134). In some examples, user interface 1102 may provide user 808 with information and/or visuals related to a planogram graphic and corresponding shelf-edge data. The shelf-edge data may be annotated/labeled with a feature 1116 (for example, a callout or box) denoting the missing or misplaced item. User 1108 may then take further action based on the user interface. For example, user 1108 may trigger a restock of item 1114*b*, may trigger rearrangement of the shelf and/or the planogram, or may determine that the item 1114*b* is actually present in the shelf-edge data, and that the shelf-edge data needs to be re-annotated (and, in some examples, that a machine learning model needs to be retrained to increase accuracy).

User interfaces such as 1100 may be utilized in other use cases by the enterprise and other tenants. For example, annotation of vision data from external cameras may help the enterprise to recognize parking and pedestrian walk areas. Annotation of vision data from cameras within warehouses, packing facilities, and/or sortation facilities may help identify packaging containers, efficient packing of items in containers, and identification of waste. Annotation of vision data from item/product tenants or customers may help to identify items customers wish to purchase and tailor recommendations. Annotation of vision data from checkout or self-checkout lanes may increase efficiency of POS systems and may decrease the number of items stolen. In such use cases, annotations presented to consuming tenants (and presented on relevant user interfaces) may vary, for example, annotations may include labels, bounding boxes, color scales, or other annotations. Large amounts of data from many vision data sources can be efficiently and quickly processed and annotated at the single vision data platform described herein, while maintaining security features and access rights as required.

Figure 12:
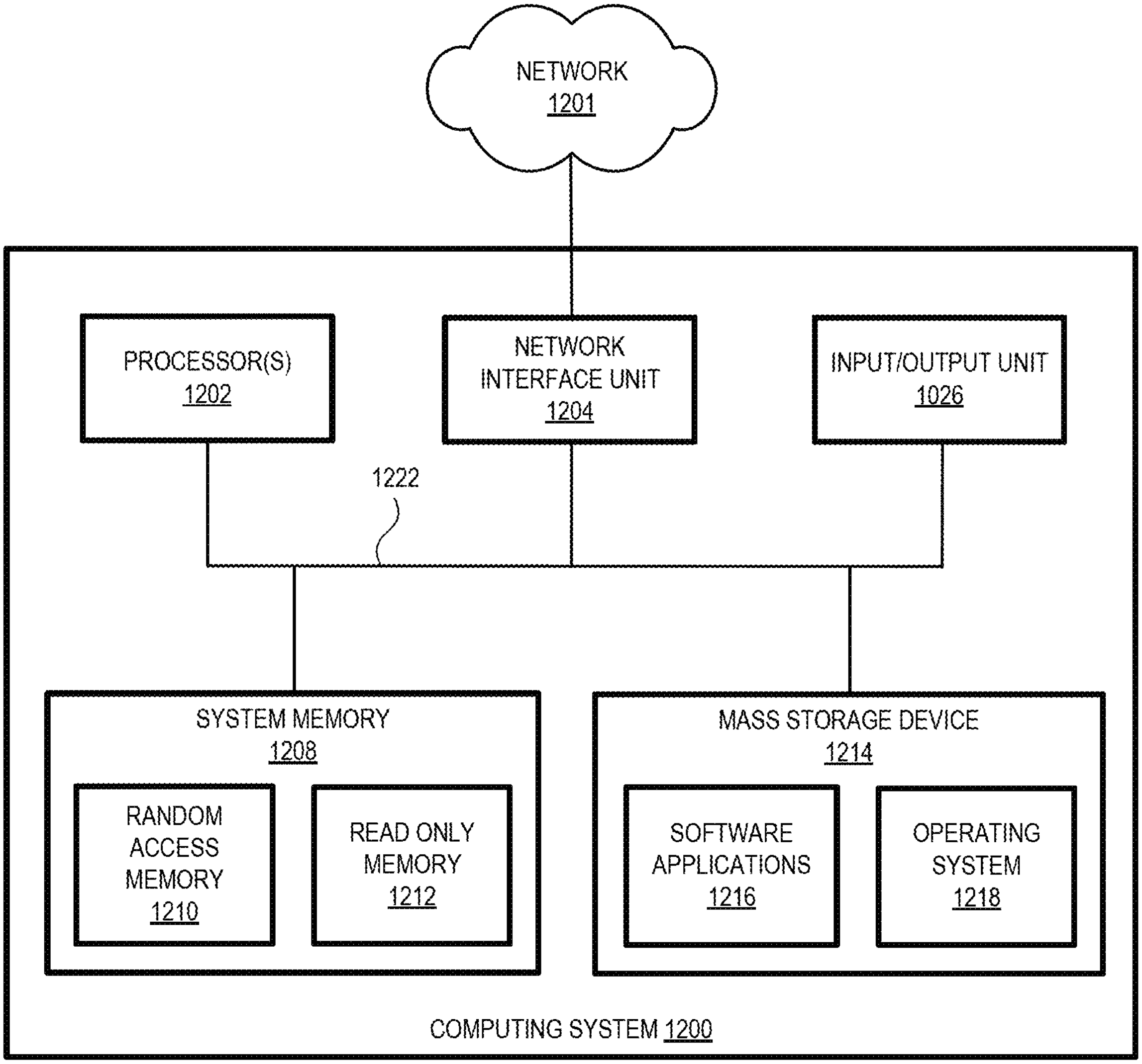
FIG. 12 illustrates an example block diagram of a computing system.

FIG. 12 illustrates an example block diagram of a virtual or physical computing system 1200. One or more aspects of the computing system 1200 can be used to implement the vision data platform 102, store instructions described herein, and preform operations described herein.

In the embodiment shown, the computing system 1200 includes one or more processors 1202, a system memory 1208, and a system bus 1222 that couples the system memory 1208 to the one or more processors 1202. The system memory 1208 includes RAM (Random Access Memory) 1210 and ROM (Read-Only Memory) 1212. A basic input/output system that contains the basic routines that help to transfer information between elements within the computing system 1200, such as during startup, is stored in the ROM 1212. The computing system 1200 further includes a mass storage device 1214. The mass storage device 1214 is able to store software instructions and data. The one or more processors 1202 can be one or more central processing units or other processors.

The mass storage device 1214 is connected to the one or more processors 1202 through a mass storage controller (not shown) connected to the system bus 1222. The mass storage device 1214 and its associated computer-readable data storage media provide non-volatile, non-transitory storage for the computing system 1200. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, DVD (Digital Versatile Discs), other optical storage media, magnetic cassettes, magnetic tape, magnetic disk storage or other magnetic storage devices, or any other medium which can be used to store the desired information and which can be accessed by the computing system 1200.

According to various embodiments of the invention, the computing system 1200 may operate in a networked environment using logical connections to remote network devices through the network 1201. The network 1201 is a computer network, such as an enterprise intranet and/or the Internet. The network 1201 can include a LAN, a Wide Area Network (WAN), the Internet, wireless transmission mediums, wired transmission mediums, other networks, and combinations thereof. The computing system 1200 may connect to the network 1201 through a network interface unit 1204 connected to the system bus 1222. It should be appreciated that the network interface unit 1204 may also be utilized to connect to other types of networks and remote computing systems. The computing system 1200 also includes an input/output controller 1206 for receiving and processing input from a number of other devices, including a touch user interface display screen, or another type of input device. Similarly, the input/output controller 1206 may provide output to a touch user interface display screen or other type of output device.

As mentioned briefly above, the mass storage device 1214 and the RAM 1210 of the computing system 1200 can store software instructions and data. The software instructions include an operating system 1218 suitable for controlling the operation of the computing system 1200. The mass storage device 1214 and/or the RAM 1210 also store software instructions, that when executed by the one or more processors 1202, cause one or more of the systems, devices, or components described herein to provide functionality described herein. For example, the mass storage device 1214 and/or the RAM 1210 can store software instructions that, when executed by the one or more processors 1202, cause the computing system 1200 to receive and execute managing network access control and build system processes.

While particular uses of the technology have been illustrated and discussed above, the disclosed technology can be used with a variety of data structures and processes in accordance with many examples of the technology. The above discussion is not meant to suggest that the disclosed technology is only suitable for implementation with the data structures shown and described above. For examples, while certain technologies described herein were primarily described in the context of assigning attributes to images, technologies disclosed herein are applicable to data structures generally.

This disclosure described some aspects of the present technology with reference to the accompanying drawings, in which only some of the possible aspects were shown. Other aspects can, however, be embodied in many different forms and should not be construed as limited to the aspects set forth herein. Rather, these aspects were provided so that this disclosure was thorough and complete and fully conveyed the scope of the possible aspects to those skilled in the art.

As should be appreciated, the various aspects (e.g., operations, memory arrangements, etc.) described with respect to the figures herein are not intended to limit the technology to the particular aspects described. Accordingly, additional configurations can be used to practice the technology herein and/or some aspects described can be excluded without departing from the methods and systems disclosed herein.

Similarly, where operations of a process are disclosed, those operations are described for purposes of illustrating the present technology and are not intended to limit the disclosure to a particular sequence of operations. For example, the operations can be performed in differing order, two or more operations can be performed concurrently, additional operations can be performed, and disclosed operations can be excluded without departing from the present disclosure. Further, each operation can be accomplished via one or more sub-operations. The disclosed processes can be repeated.

Although specific aspects were described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

The invention claimed is:

1. A computing system, comprising:

at least one processor; and at least one memory storing computer-executable instructions, the computer-executable instructions when executed by the at least one processor causing the computer to:

receive:

a plurality of images to be annotated at a machine learning platform trained using a training data set, the training data set comprising annotated image data, and a budget for the annotation of the plurality of images;

automatically annotate, at the machine learning platform, each of the plurality of images, wherein each annotated image of the plurality of images has an associated annotation confidence score;

select a first set of images of the plurality of images, the first set of images being lesser in quantity than the plurality of images, the first set of images having an annotation confidence score below a threshold;

receive user-directed re-annotated images of each of the first set of images, the re-annotated images having an annotation confidence score above the threshold, wherein annotating each image of the first set of images by a user draws from the budget;

train the machine learning platform using the re-annotated images;

randomly select a second set of images of the plurality of images, the second set of images being lesser in quantity than the plurality of images;

validate a resulting machine learning model using a first validation set, wherein validating the resulting machine learning model comprises:

receiving user-directed annotated images of each of the second set of images, the annotated second set of images being designated as the first validation set, wherein annotating each image of the second set of images by the user draws from the budget;

automatically annotating, at the machine learning platform, each of the second set of images; and comparing the automatically annotated second set of images and the first validation set;

update the machine learning platform based on the validation;

determine a remaining amount of the budget;

based on the remaining amount of the budget:

randomly select a test set of images of the plurality of images, the test set of images being lesser in quantity than the plurality of images;

receive user-directed annotated images of each of the test set of images, wherein annotating each image of the test set of images by the user draws from the budget;

automatically annotate, at the updated machine learning platform, each annotated image of the annotated test set of images, thereby testing the machine learning model;

calculate final annotation confidence scores for each of the annotated test set of images; and automatically annotate, at the machine learning platform, utilizing the tested machine learning model, each image of the plurality of images that was not included in a previously selected set of images for annotation.

2. The computing system of claim 1, further comprising instructions to:

wherein the remaining amount of budget indicates that the budget is sufficient to further train and validate the machine learning model, and prior to selecting the test set of images, select a third set of images of the plurality of images, the third set of images being lesser in quantity than the plurality of images, the third set of images having a confidence score below the threshold;

receive user-directed annotated images of each of the third set of images, the re-annotated images having a confidence score above the threshold, wherein annotating each image of the third set of images by the user draws from the budget;

train the machine learning platform using the re-annotated images;

randomly select a fourth set of images of the plurality of images, the fourth set of images being lesser in quantity than the plurality of images;

validate the resulting machine learning model using a second validation set, wherein validating the resulting machine learning model comprises;

receiving user-directed annotated images of each of the fourth set of images, the annotated fourth set of images being designated as the second validation set, wherein annotating each image of the fourth set of images by the user draws from the budget;

automatically annotating, at the machine learning platform, each of the fourth set of images; and comparing the automatically annotated fourth set of images and the second validation set;

update the machine learning platform based on the validation; and determine that the budget includes only a quantity of budget sufficient to annotate the test set of images.

3. The computing system of claim 1, wherein the user-directed annotated images are received from an annotation tool operated by an annotation user via an annotation user interface.

4. The computing system of claim 1, wherein the plurality of images represents a set of images of a plurality of sets of images, wherein each set of images has an assigned annotation priority.

5. The computing system of claim 1, wherein the machine learning platform is configured to generate an object recognition machine learning model.

6. The computing system of claim 1, wherein the machine learning platform is configured to generate a text recognition machine learning model.

7. The computing system of claim 1, wherein each of the plurality of images has an associated context, and wherein automatic annotation is based at least in part on the context.

8. A method, comprising:

receiving a plurality of images to be annotated at a machine learning platform trained using a training data set, the training data set comprising annotated image data;

automatically annotating, at the machine learning platform, each of the plurality of images, wherein each annotated image of the plurality of images has an associated annotation confidence score;

selecting a first set of images of the plurality of images, the first set of images being lesser in quantity than the plurality of images, the first set of images having an annotation confidence score below a threshold;

receiving user-directed re-annotated images of each of the first set of images, the re-annotated images having an annotation confidence score above the threshold, wherein annotating each image of the first set of images by the user draws from a budget;

training the machine learning platform using the re-annotated images;

randomly selecting a second set of images of the plurality of images, the second set of images being lesser in quantity than the plurality of images;

validating a resulting machine learning model using a first validation set, wherein validating the resulting machine learning model comprises:

receiving user-directed annotated images of each of the second set of images, the annotated second set of images being designated as the first validation set, wherein annotating each image of the second set of images by the user draws from the budget;

automatically annotating, at the machine learning platform, each of the second set of images; and comparing the automatically annotated second set of images and the first validation set;

updating the machine learning platform based on the validation;

determining a remaining amount of the budget;

based on the remaining amount of the budget:

randomly selecting a test set of images of the plurality of images, the test set of images being lesser in quantity than the plurality of images;

receiving user-directed annotated images of each of the test set of images, wherein annotating each image of the test set of images by the user draws from the budget;

automatically annotating, at the updated machine learning platform, each annotated image of the annotated test set of images, thereby testing the machine learning model;

calculating final annotation confidence scores for each of the annotated test set of images; and automatically annotating, at the machine learning platform, utilizing the tested machine learning model, each image of the plurality of images that was not included in a previously selected set of images for annotation.

9. The method of claim 8, further comprising:

wherein the remaining amount of budget indicates that the budget is sufficient to further train and validate the machine learning model, and prior to selecting the test set of images, selecting a third set of images of the plurality of images, the third set of images being lesser in quantity than the plurality of images, the third set of images having a confidence score below the threshold;

receiving user-directed annotated images of each of the third set of images, the re-annotated images having a confidence score above the threshold, wherein annotating each image of the third set of images by the user draws from the budget;

training the machine learning platform using the re-annotated images;

randomly selecting a fourth set of images of the plurality of images, the fourth set of images being lesser in quantity than the plurality of images;

validating the resulting machine learning model using a second validation set, wherein validating the resulting machine learning model comprises;

receiving user-directed annotated images of each of the fourth set of images, the annotated fourth set of images being designated as the second validation set, wherein annotating each image of the fourth set of images by the user draws from the budget;

automatically annotating, at the machine learning platform, each of the fourth set of images; and comparing the automatically annotated fourth set of images and the second validation set;

updating the machine learning platform based on the validation; and determining that the budget includes only a quantity of budget sufficient to annotate the test set of images.

10. The method of claim 8, wherein the user-directed annotated images are received from an annotation tool operated by an annotation user via an annotation user interface.

11. The method of claim 8, wherein the plurality of images represents a set of images of a plurality of sets of images, wherein each set of images has an assigned annotation priority.

12. The method of claim 8, wherein the machine learning platform is configured to generate an object recognition machine learning model.

13. The method of claim 8, wherein the machine learning platform is configured to generate a text recognition machine learning model.

14. The method of claim 8, wherein each of the plurality of images has an associated context, and wherein automatic annotation is based at least in part on the context.

15. A computing system, comprising:

at least one processor; and at least one memory storing computer-executable instructions, the computer-executable instructions when executed by the at least one processor causing the computing system to:

receive an annotation request at an annotation tool, the annotation request identifying a model and a training data set including a plurality of images to be annotated;

automatically annotate, at a machine learning platform, each of the plurality of images in the training data set, wherein each annotated image of the plurality of images has an associated annotation confidence score;

select a first subset of images of the plurality of images having annotation confidence scores below a threshold;

receive user-directed re-annotation of each of the first set of images, wherein the user-directed re-annotation of each image of the first set of images by a user draws from a budget;

retrain the model at the machine learning platform using the plurality of images in the training data set including a portion of the automatically annotated images having annotation confidence scores above the threshold and the re-annotated images to form a retrained model;

select a second subset of images of the plurality of images;

receive user-directed re-annotation of each of the second set of images;

validate the retrained model by comparing the user-directed re-annotation of each of the second set of images against automatic annotations of each of the second set of images generated using the retrained model;

determine a remaining amount of the budget;

based on the remaining amount of the budget, determine whether to iteratively select a further subset of the plurality of images for user-directed re-annotation; and automatically annotate, at the machine learning platform, utilizing the retrained model, each image of a plurality of images that was not included in a previously selected set of images for annotation.

16. The computing system of claim 15, wherein the computing system is further configured to: based on the remaining amount of the budget falling below a threshold, calculate final annotation confidence scores for each of the plurality of images.

17. The computing system of claim 15, wherein the model is a context specific model and the plurality of images are associated with a context of the context-specific model.

* * * * *